(12) United States Patent
Porat

(10) Patent No.: US 9,203,673 B2
(45) Date of Patent: *Dec. 1, 2015

(54) MULTI-CHANNEL SUPPORT WITHIN SINGLE USER, MULTIPLE USER, MULTIPLE ACCESS, AND/OR MIMO WIRELESS COMMUNICATIONS

(71) Applicant: BROADCOM CORPORATION, Irvine, CA (US)

(72) Inventor: Ron Porat, San Diego, CA (US)

(73) Assignee: BROADCOM CORPORATION, Irvine, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 13/872,591

(22) Filed: Apr. 29, 2013

(65) Prior Publication Data
US 2013/0301556 A1   Nov. 14, 2013

Related U.S. Application Data

(60) Provisional application No. 61/646,342, filed on May 13, 2012, provisional application No. 61/648,028, filed on May 16, 2012, provisional application No. 61/815,374, filed on Apr. 24, 2013, provisional application No. 61/815,382, filed on Apr. 24, 2013.

(51) Int. Cl.
*H04W 4/00* (2009.01)
*H04L 27/26* (2006.01)
(Continued)

(52) U.S. Cl.
CPC ........... *H04L 27/2636* (2013.01); *H04L 1/006* (2013.01); *H04L 1/0033* (2013.01);
(Continued)

(58) Field of Classification Search
USPC .................. 370/208–210, 320, 328–339, 441
See application file for complete search history.

(56) References Cited

U.S. PATENT DOCUMENTS

2011/0096856 A1    4/2011  Sadowsky et al.
2012/0230448 A1*   9/2012  Kang et al. ................... 375/295
(Continued)

FOREIGN PATENT DOCUMENTS

CN    101039162 A    9/2007
EP      2424143 A1   2/2012
(Continued)

OTHER PUBLICATIONS

Park; IEEE P802.11 Wireless LANs: Proposed Specification Framework for TGah; Mar. 12, 2012; pp. 1-13 Retrieved from the internet: URL:https//mentor.ieee.org/802.11/dcn/11/11-11-1137-06-00ah-specification-framework-for-tgah-docx. [retrieved on Aug. 21, 2013].
(Continued)

*Primary Examiner* — Frank Duong
(74) *Attorney, Agent, or Firm* — Garlick & Markison; Shayne X. Short

(57) ABSTRACT

Multi-channel support within single user, multiple user, multiple access, and/or MIMO wireless communications. A processor of the communication device is implemented to process a signal to generate processed signals. Also, the communication device includes multiple inverse discrete fast Fourier transform (IDFT) processors respectively to process the processed signals to generate a signal streams respectively across channels (e.g., a first of the IDFT processors is implemented to process a first processed signal to generate a first signal stream based on a fast Fourier transform (FFT) channelization across a first number of orthogonal frequency division multiplexing (OFDM) tones, and a second of the IDFT processors is implemented to process a second processed signal to generate a second signal stream based on the FFT channelization across a second number of OFDM tones). The communication device also includes communication interface(s) to transmit the signal streams to at least one additional communication device.

20 Claims, 24 Drawing Sheets

(51) Int. Cl.
 *H04L 1/00* (2006.01)
 *H04L 1/06* (2006.01)
 *H04L 5/00* (2006.01)

(52) U.S. Cl.
 CPC ............ *H04L1/0041* (2013.01); *H04L 1/0071* (2013.01); *H04L 1/06* (2013.01); *H04L 5/0046* (2013.01); *H04L 27/2626* (2013.01); *H04L 27/2633* (2013.01); *H04L 5/001* (2013.01)

(56) References Cited

U.S. PATENT DOCUMENTS

2012/0263156 A1* 10/2012 Abraham et al. ............. 370/338
2012/0324315 A1* 12/2012 Zhang et al. .................. 714/776
2013/0229996 A1* 9/2013 Wang et al. ................... 370/329
2013/0266083 A1* 10/2013 Baik et al. ..................... 375/260

FOREIGN PATENT DOCUMENTS

WO 2011136582 A2 11/2011
WO 2012051319 A1 4/2012

OTHER PUBLICATIONS

Porat; TGaf PHY Proposal; IEEE; May 14, 2012; pp. 1-21 Retrieved from the Internet: URL: https://mentor.ieee.org/802.11/dcn/12/11-12-0616-00-00af-phy-proposal.pptx [retrieved on Aug. 20, 2013].

European Patent Office; European Search Report; EP Application No. 13002382.3; Sep. 2, 2013; 3 pgs.

European Patent Office; European Search Report; EP Application No. 13002383.1; Sep. 2, 2013; 3 pgs.

Park; Proposed Specification Framework for TGah; IEEE 802.11-yy/xxxxr06; Mar. 2012; 13 pgs.

* cited by examiner

1600

|  | SU | MU |
|---|---|---|
| SU/MU indication | 1 | 1 |
| Length/Duration | 9 | 9 |
| MCS | 4 |  |
| Bandwidth (BW) | 2 | 2 |
| Aggregation | 1 |  |
| STBC | 1 | 1 |
| Coding | 2 | 5 |
| SGI | 1 | 1 |
| GID |  | 6 |
| Nsts | 2 | 8 |
| PAID | 9 |  |
| Reserved | 12 | 11 |
| CRC | 4 | 4 |
| Tail | 6 | 6 |
| TOTAL | 54 | 54 |

- SIG field, one 128 FFT symbol up to 54 information bits

FIG. 16

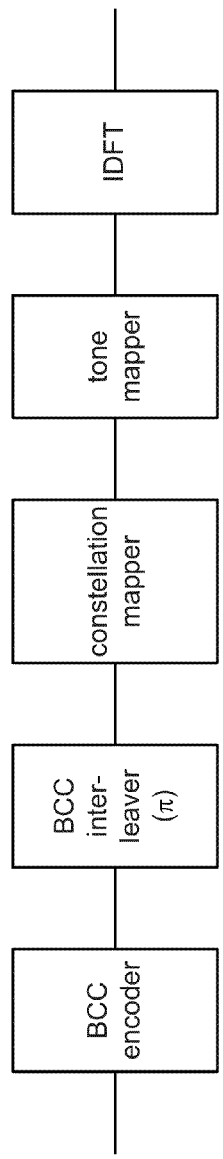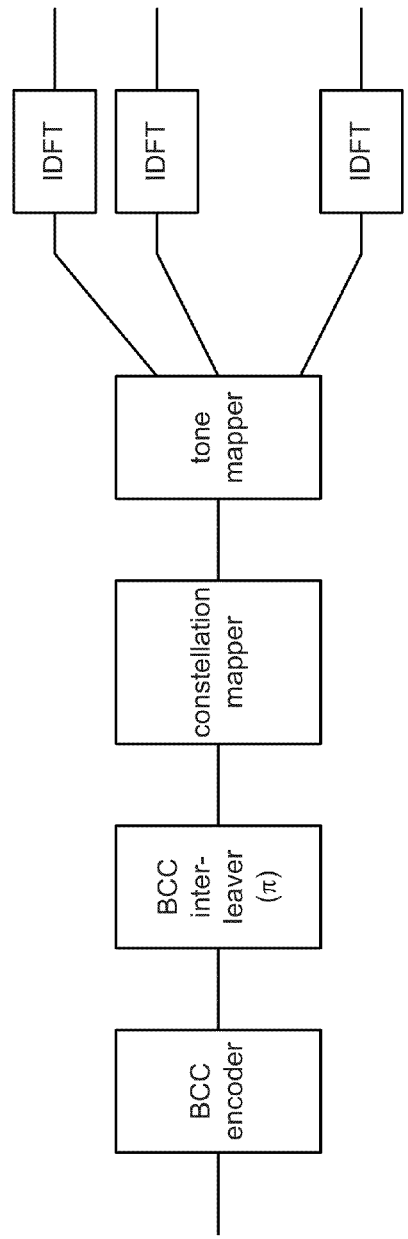
FIG. 23

MULTI-CHANNEL SUPPORT WITHIN SINGLE USER, MULTIPLE USER, MULTIPLE ACCESS, AND/OR MIMO WIRELESS COMMUNICATIONS

CROSS REFERENCE TO RELATED PATENTS/PATENT APPLICATIONS

The present U.S. Utility patent application claims priority pursuant to 35 U.S.C. §119(e) to the following U.S. Provisional patent application which are hereby incorporated herein by reference in their entirety and made part of the present U.S. Utility patent application for all purposes:

1-4. U.S. Provisional Patent Apps. Ser. Nos. 61/646,342; 61/648,028; 61/815,374; and 61/815,382, entitled "Multi-channel support within single user, multiple user, multiple access, and/or MIMO wireless communications," filed May 13, 2012, May 16, 2012, Apr. 24, 2013, and Apr. 24, 2013, respectively.

The following U.S. Utility patent application is hereby incorporated herein by reference in its entirety and made part of the present U.S. Utility patent application for all purposes:

1. U.S. Utility patent application Ser. No. 13/872,574, entitled "Multi-channel support within single user, multiple user, multiple access, and/or MIMO wireless communications," filed concurrently on Apr. 29, 2013, pending, which also claims priority pursuant to 35 U.S.C. §119(e) to the four (4) respective U.S. Provisional patent application above.

BACKGROUND OF THE INVENTION

1. Technical Field of the Invention

The invention relates generally to communication systems; and, more particularly, it relates to multi-channel signaling, devices, and/or operation of devices within single user, multiple user, multiple access, and/or MIMO wireless communications.

2. Description of Related Art

Communication systems support wireless and wire lined communications between wireless and/or wire lined communication devices, range from national and/or international cellular telephone systems to the Internet to point-to-point in-home wireless networks, and operate in accordance with one or more communication standards. For instance, wireless communication systems may operate in accordance with one or more standards including, but not limited to, IEEE 802.11x, Bluetooth, advanced mobile phone services (AMPS), digital AMPS, global system for mobile communications (GSM), etc., and/or variations thereof.

In some instances, wireless communication between a transmitter (TX) and receiver (RX) is a single-output-single-input (SISO) communication. Other types of wireless communications include single-input-multiple-output (SIMO) (e.g., a single TX processes data into RF signals that are transmitted to a RX that includes two or more antennae and two or more RX paths), multiple-input-single-output (MISO) (e.g., a TX includes two or more transmission paths (e.g., digital to analog converter, filters, up-conversion module, and a power amplifier) that each converts a corresponding portion of baseband signals into RF signals, which are transmitted via corresponding antennae to a RX), and multiple-input-multiple-output (MIMO) (e.g., a TX and RX each include multiple paths such that a TX parallel processes data using a spatial and time encoding function to produce two or more streams of data and a RX receives the multiple RF signals via multiple RX paths that recapture the streams of data utilizing a spatial and time decoding function).

BRIEF DESCRIPTION OF THE SEVERAL VIEWS OF THE DRAWINGS

FIG. 16 illustrates an embodiment of a signal field (SIG) format.

FIG. 23 illustrates an alternative embodiment of support for a number of contiguous channels based on centrally located information among a number of available tones within one or more TVWS channels.

DETAILED DESCRIPTION OF THE INVENTION

Figure 1:
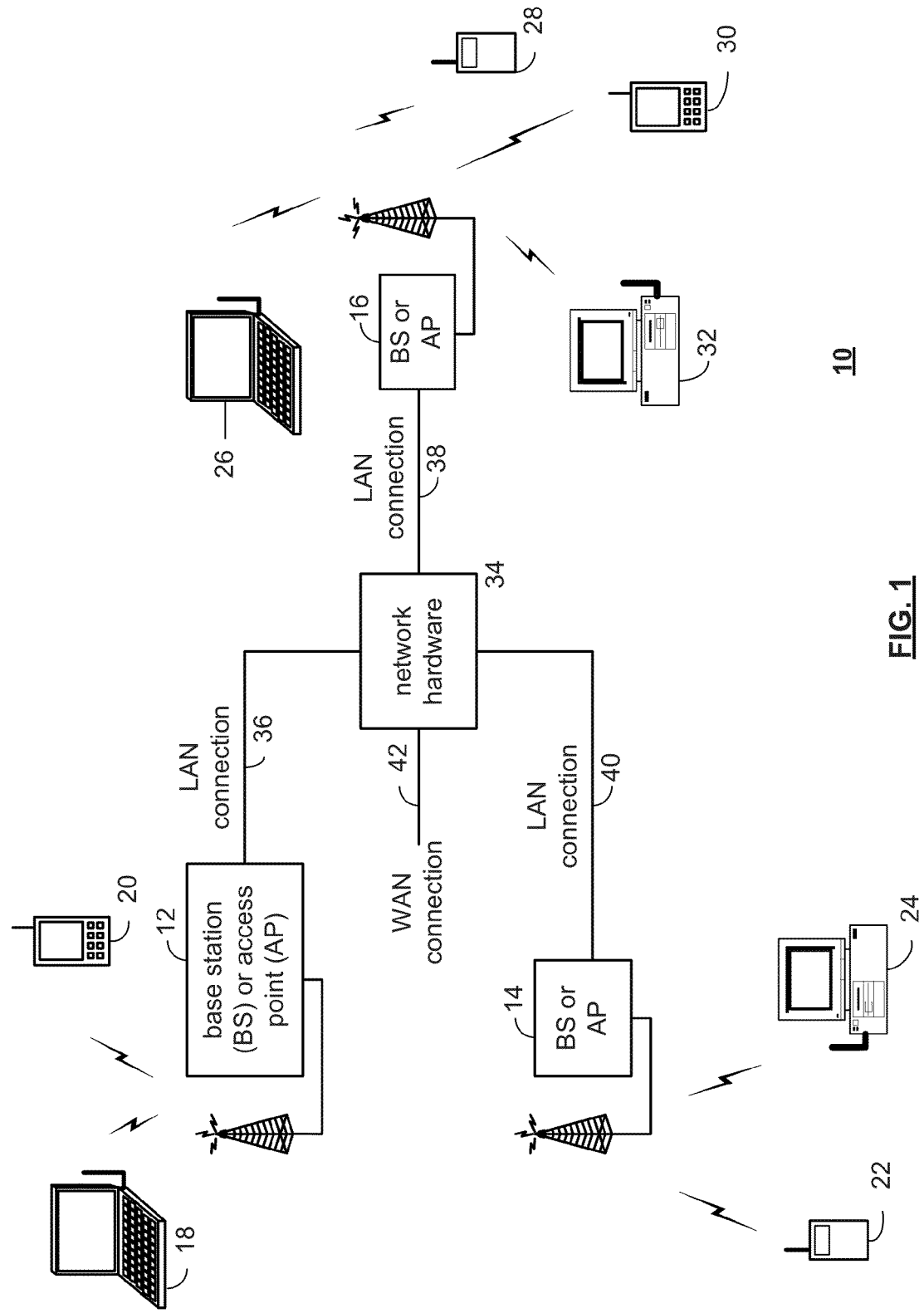
FIG. 1 is a diagram illustrating an embodiment of a wireless communication system.

FIG. 1 is a diagram illustrating an embodiment of a wireless communication system 10 that includes base stations and/or access points 12-16, wireless communication devices (WCDs) 18-32 and a network hardware component 34. WCDs 18-32 may be laptop host computers 18, 26, personal digital assistant hosts 20, 30, personal computer hosts 24, 32 and/or cellular telephone hosts 22 and 28. The details of an embodiment of such WCDs are described in greater detail with reference to FIG. 2.

The base stations (BSs) or access points (APs) 12-16 are operably coupled to the network hardware 34 via local area network connections 36, 38 and 40. The network hardware 34, which may be a router, switch, bridge, modem, system controller, etc., provides a wide area network connection 42 for the communication system 10. Each of the base stations or access points 12-16 has an associated antenna or antenna array to communicate with the WCDs in its area. Typically, the WCDs register with a particular base station or access point 12-14 to receive services from the communication system 10. For direct connections (i.e., point-to-point communications), WCDs communicate directly via an allocated channel.

Figure 2:
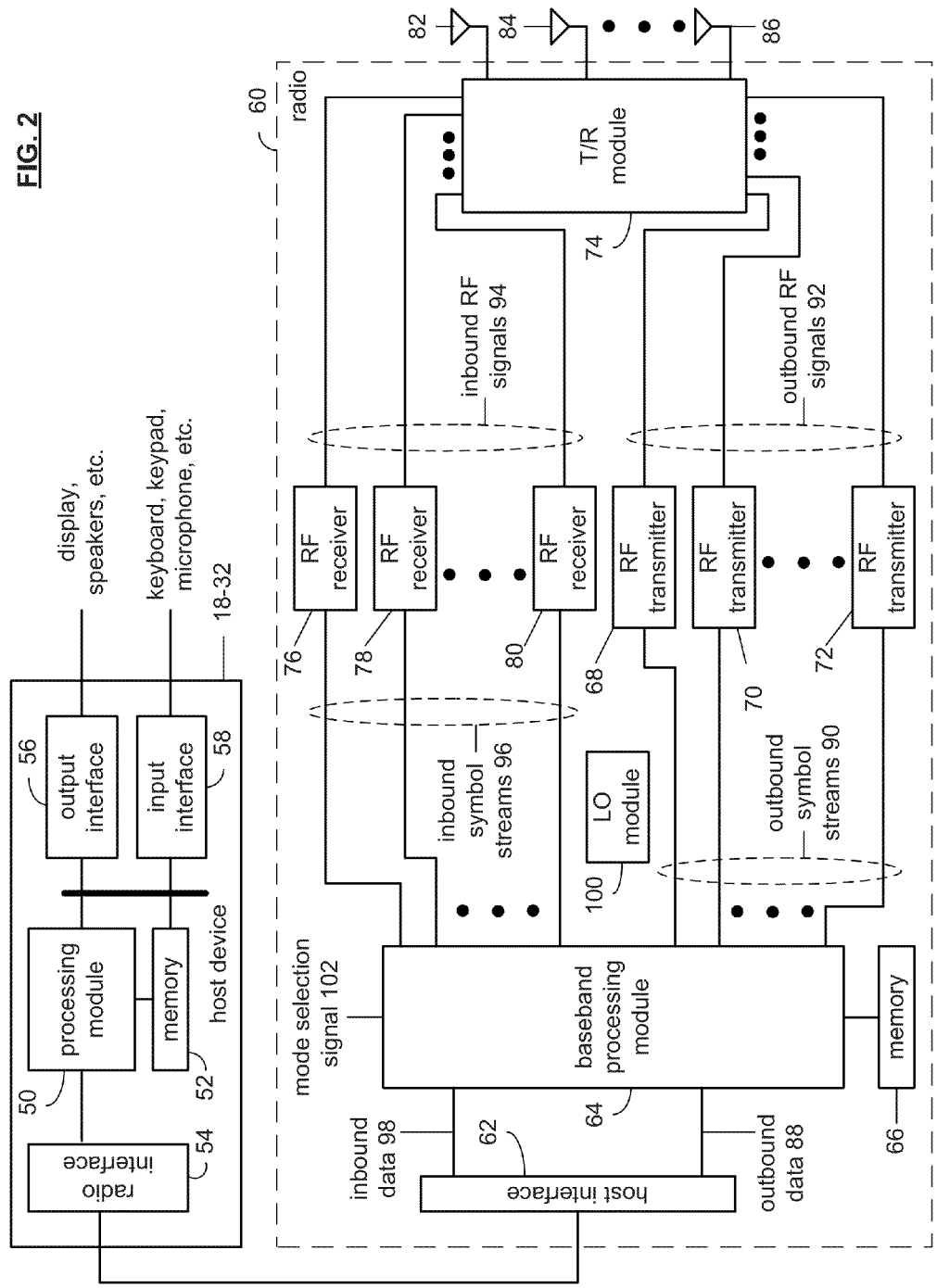
FIG. 2 is a diagram illustrating an embodiment of a wireless communication device (WCD).

FIG. 2 is a diagram illustrating an embodiment of a WCD that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component. For access points or base stations, the components are typically housed in a single structure. Host device 18-32 includes a processing module 50, memory 52, radio interface 54, input interface 58 and output interface 56. Processing module 50 and memory 52 execute corresponding instructions typically done by the host device. For example, for a cellular telephone host device, the processing module 50 performs the corresponding communication functions based on a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc. such that the received data may be displayed. The radio interface 54 also provides data from the processing module 50 to the radio 60. The processing module 50 may receive the outbound data from an input device such as a keyboard, keypad, microphone, etc. via the input interface 58 or generate the data itself.

Radio 60 includes a host interface 62, a baseband processing module (BPM) 64, memory 66, radio frequency (RF) transmitters 68-72, a transmit/receive (T/R) module 74, antennae 82-86, RF receivers 76-80, and a local oscillation module 100. The BPM 64, in combination with operational instructions stored in memory 66, execute digital receiver functions and digital transmitter functions, respectively. The digital receiver functions include, but are not limited to, digital intermediate frequency to baseband conversion, demodulation, constellation demapping, decoding, de-interleaving, fast Fourier transform (FFT), cyclic prefix removal, space and time decoding, and/or descrambling. The digital transmitter functions, as will be described in greater detail with reference to later Figures, include, but are not limited to, scrambling, encoding, interleaving, constellation mapping, modulation, inverse FFT, cyclic prefix addition, space and time encoding, and/or digital baseband to IF conversion.

In operation, the radio 60 receives outbound data 88 from the host device via the host interface 62. The BPM 64 receives the outbound data 88 and, based on a mode selection signal 102, produces one or more outbound symbol streams 90. The mode selection signal 102 will indicate a particular mode as are illustrated in the mode selection tables as may be understood by the reader. For example, the mode selection signal 102 may indicate a frequency band of 2.4 GHz or 5 GHz, a channel bandwidth (BW) of 20 or 22 MHz (e.g., channels of 20 or 22 MHz width) and a maximum bit rate of 54 megabits-per-second. In other embodiments, the channel BW may extend up to 1.28 GHz or wider with supported maximum bit rates extending to 1 gigabit-per-second or greater. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. Also, in such mode selection tables, a code rate is supplied as well as number of coded bits per sub-carrier (NBPSC), coded bits per OFDM symbol (NCBPS), data bits per OFDM symbol (NDBPS). The mode selection signal may also indicate a particular channelization for the corresponding mode which for the information in one of the mode selection tables with reference to another of the mode selection tables. It is of course noted that other types of channels, having different BWs, may be employed in other embodiments without departing from the scope and spirit of the invention.

The BPM 64, based on the mode selection signal 102 produces the one or more outbound symbol streams 90 from the output data 88. For example, if the mode selection signal 102 indicates that a single transmit antenna is being utilized for the particular mode that has been selected, the BPM 64 will produce a single outbound symbol stream 90. Alternatively, if the mode selection signal indicates 2, 3 or 4 antennae, the BPM 64 will produce 2, 3 or 4 outbound symbol streams 90 corresponding to the number of antennae from the output data 88.

Depending on the number of outbound streams 90 produced by the baseband module 64, a corresponding number of the RF transmitters 68-72 will be enabled to convert the outbound symbol streams 90 into outbound RF signals 92. The transmit/receive module 74 receives the outbound RF signals 92 and provides each outbound RF signal to a corresponding antenna 82-86.

When the radio 60 is in the receive mode, the transmit/receive module 74 receives one or more inbound RF signals via the antennae 82-86. The T/R module 74 provides the inbound RF signals 94 to one or more RF receivers 76-80. The RF receiver 76-80 converts the inbound RF signals 94 into a corresponding number of inbound symbol streams 96. The number of inbound symbol streams 96 will correspond to the particular mode in which the data was received. The BPM 64 receives the inbound symbol streams 96 and converts them into inbound data 98, which is provided to the host device 18-32 via the host interface 62.

In one embodiment of radio 60 it includes a transmitter and a receiver. The transmitter may include a MAC module, a PLCP module, and a PMD module. The Medium Access Control (MAC) module, which may be implemented with the processing module 64, is operably coupled to convert a MAC Service Data Unit (MSDU) into a MAC Protocol Data Unit (MPDU) based on a WLAN protocol. The Physical Layer Convergence Procedure (PLCP) Module, which may be implemented in the processing module 64, is operably coupled to convert the MPDU into a PLCP Protocol Data Unit (PPDU) based on the WLAN protocol. The Physical Medium Dependent (PMD) module is operably coupled to convert the PPDU into radio frequency (RF) signals based on one of the operating modes of the WLAN protocol, wherein the operating modes includes multiple input and multiple output combinations.

An embodiment of the Physical Medium Dependent (PMD) module includes an error protection module, a demultiplexing module, and direction conversion modules. The error protection module, which may be implemented in the processing module 64, is operably coupled to restructure a PPDU (PLCP (Physical Layer Convergence Procedure) Protocol Data Unit) to reduce transmission errors producing error protected data. The demultiplexing module is operably coupled to divide the error protected data into error protected data streams The direct conversion modules are operably coupled to convert the error protected data streams into radio frequency (RF) signals.

As one of average skill in the art will appreciate, the WCD of FIG. 2 may be implemented using one or more integrated circuits based on any desired configuration or combination or components, modules, etc. within one or more integrated circuits.

Figure 3:
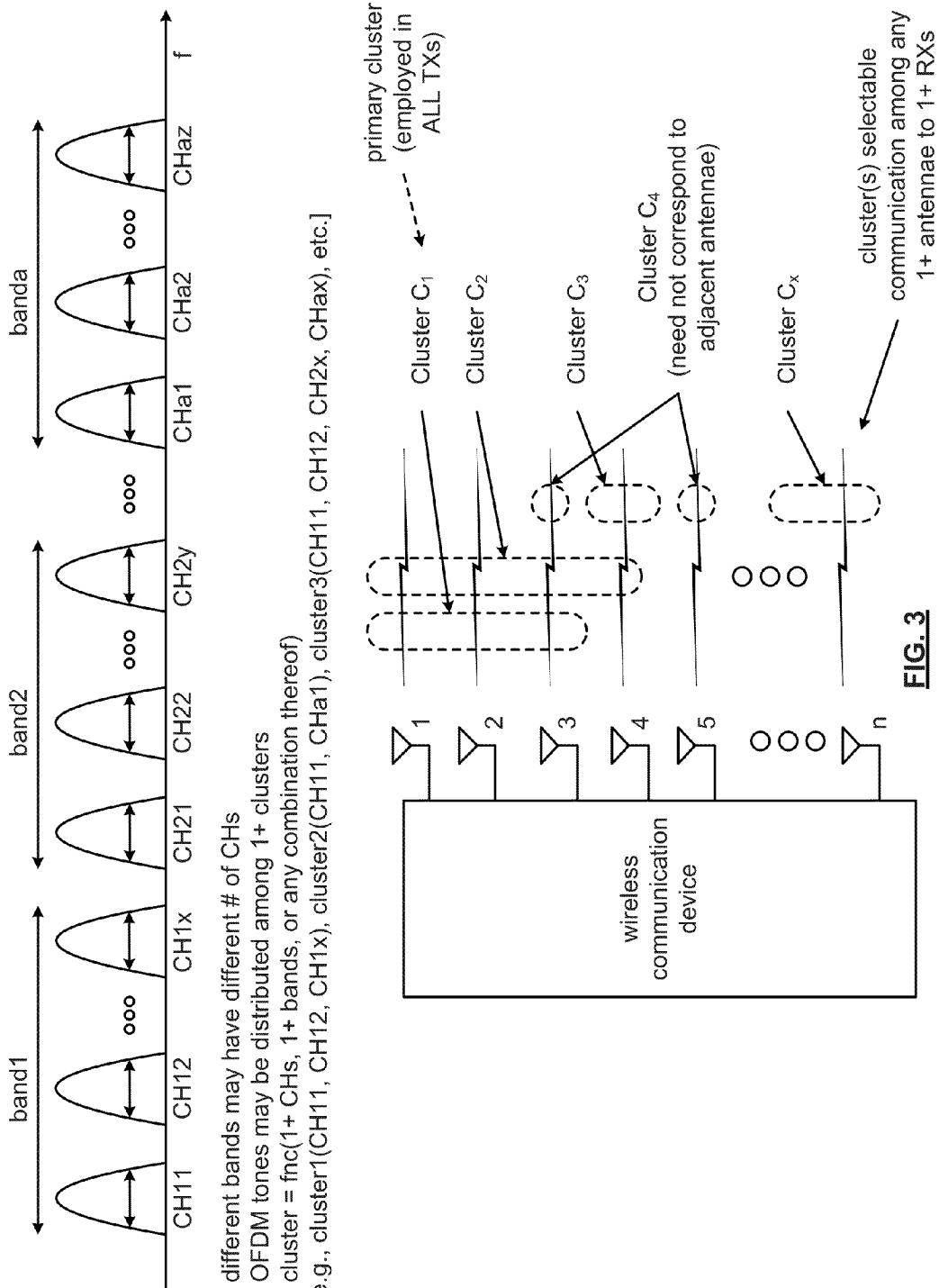
FIG. 3 is a diagram illustrating an embodiment of a WCD, and clusters, as may be employed for supporting communications with at least one additional WCD.

FIG. 3 is a diagram illustrating an embodiment of a WCD, and clusters, as may be employed for supporting communications with at least one additional WCD. Generally speaking, a cluster may be viewed as a depiction of the mapping of tones, such as for an OFDM symbol, within or among one or more channels (e.g., sub-divided portions of the spectrum) that may be situated in one or more bands (e.g., portions of the spectrum separated by relatively larger amounts). As an example, various channels of 20 MHz may be situated within or centered around a 5 GHz band. The channels within any such band may be continuous (e.g., adjacent to one another) or discontinuous (e.g., separated by some guard interval or band gap). Oftentimes, one or more channels may be situated within a given band, and different bands need not necessarily have a same number of channels therein. Again, a cluster may generally be understood as any combination of one or more channels among one or more bands.

The WCD of this diagram may be of any of the various types and/or equivalents described herein (e.g., AP, WLAN device, or other WCD including, though not limited to, any of those depicted in FIG. 1, etc.). The WCD includes multiple antennae from which one or more signals may be transmitted to one or more receiving WCDs and/or received from one or more other WCDs. Such clusters may be used for transmissions of signals via various one or more selected antennae. For example, different clusters are shown as being used to transmit signals respectively using different one or more antennae. Also, it is noted that, all such WCDs within such a communication system may of course support bi-directional communications to and from other WCDs within the communication system. In other words, the various types of transmitting WCD(s) and receiving WCD(s) may also support bi-directional communications to and from other WCDs within the communication system. Generally, such capability, functionality, operations, etc. as described herein may be applied to any WCD. Various aspects and principles, and their equivalents, of the invention as presented herein may be adapted for use in various standards, protocols, and/or recommended practices (including those currently under development) such as those based on IEEE 802.11x (e.g., where x is a, b, g, n, ac, ad, ae, af, ah, etc.).

Figure 4:
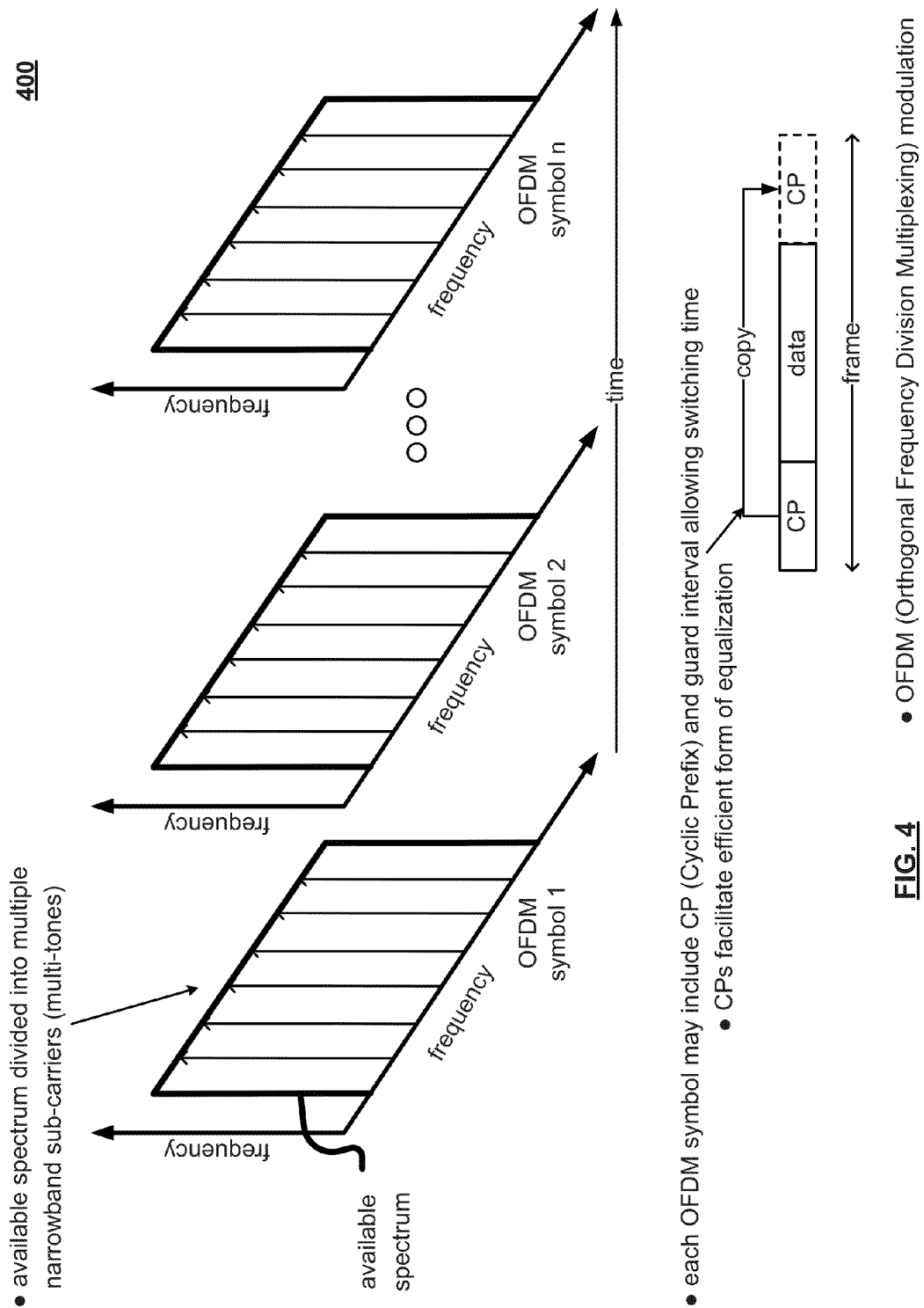
FIG. 4 illustrates an embodiment of OFDM (Orthogonal Frequency Division Multiplexing).

FIG. 4 illustrates an embodiment 400 of OFDM. OFDM modulation may be viewed as dividing up an available spectrum into narrowband sub-carriers (e.g., lower data rate carriers). Typically, the frequency responses of these sub-carriers are overlapping and orthogonal. Each sub-carrier may be modulated using any of a variety of modulation coding techniques.

Figure 5:
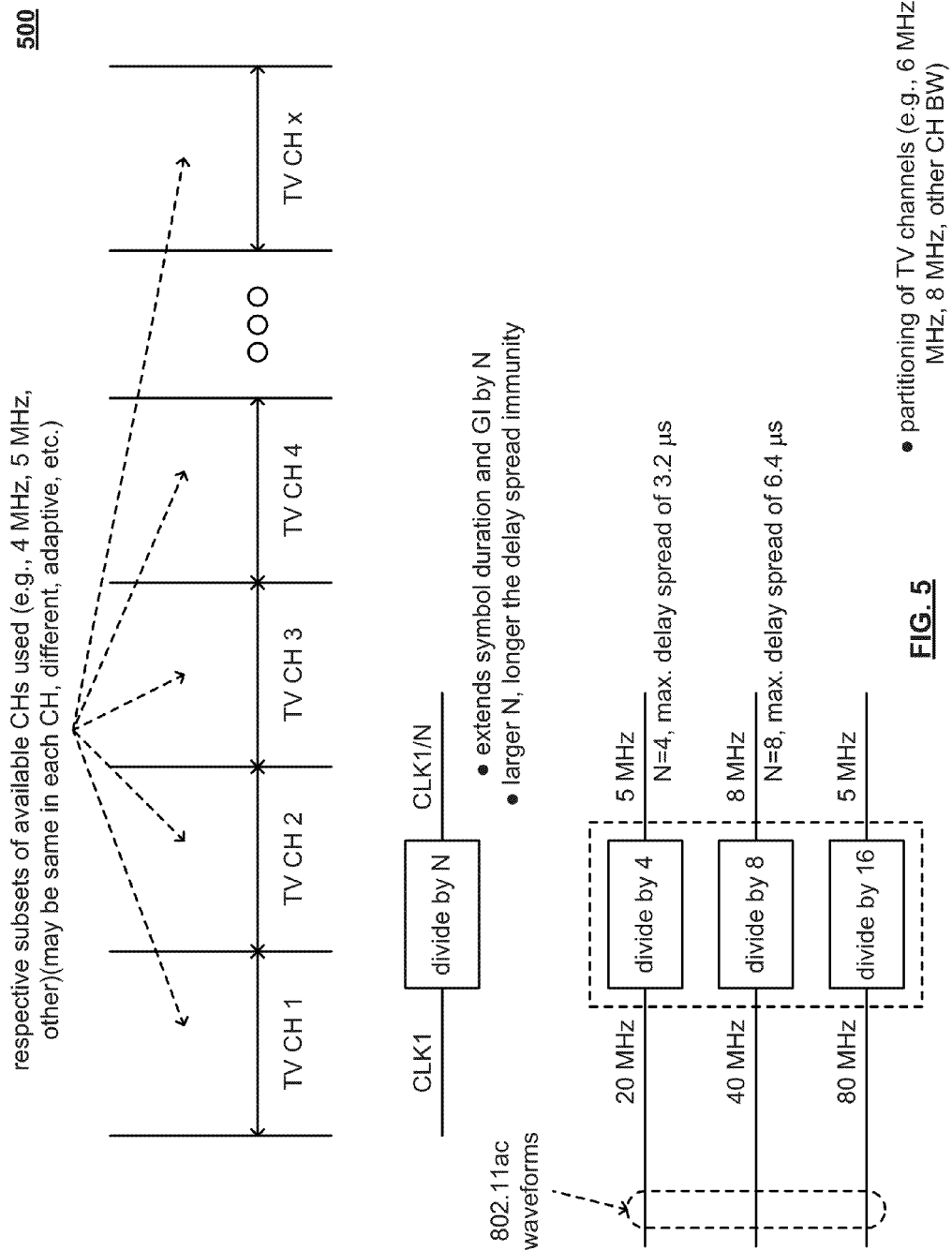
FIG. 5 illustrates an embodiment of partitioning of television (TV) channels.

FIG. 5 illustrates an embodiment 500 of partitioning of television (TV) channels. Certain WCDs may be implemented to operate within frequency spectra typically dedicated for use by television channels. For example, TV channels operating based on broadcast television may operate using particular portions of the electromagnetic frequency spectrum. Generally, frequencies associated with UHF and VHF may be employed for broadcast television. However, certain WCDs have capability to operate using some or all of these portions of the frequency spectrum when some or all of these portions of the frequency spectrum are not used for television. For example, selective operation of a WCD may be made based upon whether or not some or all of the portions of the frequency spectrum typically used for broadcast television are in use or not. Generally, portions of the frequency spectrum typically dedicated for such use (e.g., broadcast television) may instead be used for operating WCDs such as based on those operative within wireless local area network (WLAN/WiFi) or other wireless communication systems, networks, etc.

Based on providing operation of such WCDs using frequency spectra typically associated with TV channels, care must be made to ensure that operation of such WCDs is on a non-interfering basis with respect to any broadcast TV. For example, while any broadcast TV existent and such portions of the frequency spectrum are given primary or first priority, secondary or second priority may be given for use of such WCD is provided that they can operate on a non-interfering basis with respect to broadcast TV.

Based on current rules and guidelines including those provided by the Federal Communications Commission (FCC), there are very strict guidelines by which such WCD operation may be made using those portions of the frequency spectra typically associated with TV channels. For example, based upon operation based on one or more broadcast television channels, a very low spectral mask requirement (e.g., −55 dB attenuation) is required at the respective edge of a 6 MHz channel (e.g., the respective lower and upper frequency band edge boundaries are typically separated by approximately 6 MHz based on TV channels [at least in the United States], such as over the air broadcast channel 2 has a lower edge of 54 MHz and an upper edge of 60 MHz, over the air broadcast channel 3 has a lower edge of 60 MHz and upper edge of 66 MHz, etc. based on VHF low band (band I)).

Typically, operation based on IEEE 802.11x (e.g., where x is a, b, g, n, ac, ad, ae, af, ah, etc.) channels requires that a WCD provide for significantly less attenuation than is required to operate using frequency spectra typically associated with TV channels. Among others, IEEE 802.11 af is a developing standard, protocol, and/or recommended practice directed towards operation of one or more wireless local area networks (WLAN/WiFi) on a secondary, non-interfering basis with respect to broadcast television channels. Generally speaking, broadcast television channels around the world use respective channel BWs of particular widths. Considering the United States and some other countries, respective channel BWs of 6 MHz are employed. Considering Australia and some other countries, respective channel BWs of 7 MHz are employed. Considering various countries in Europe, among others, respective channel BWs of 8 MHz are employed. Regardless of the particular channel BW employed in a given application, operation of one or more wireless local area networks (WLAN/WiFi) on a secondary, non-interfering basis may be supported. It is further noted that while certain of the various embodiments and/or diagrams presented herein are directed towards channel BWs particularly of 6 MHz, it is noted that any one or more of the various aspects, embodiments, and/or their equivalents, of the invention may generally be adapted and applied towards channel BWs of different respective values (e.g., 7 MHz, 8 MHz, and/or any other particular channel BWs). That is to say, while certain of the various embodiments and/or diagrams herein are directed towards a preferred an exemplary embodiment of 6 MHz channels, any such aspects, embodiments, and/or their equivalents, of the invention may be applied to any other desired channel BW without departing from the scope and spirit of the invention.

For example, operation of a WCD based on IEEE 802.11x channels may be acceptable while providing an attenuation of approximately −10 dB at the edge of IEEE 802.11x channels. As may be understood, there is a significant spectral mask requirement for operation using frequency spectra typically associate with TV channels (e.g., −55 dB attenuation) in comparison to that which is required based on typical operation based on IEEE 802.11x channels (e.g., −10 dB attenuation). Also, for operation using frequency spectra typically associate with TV channels, there is a power spectral density (PSD) limit on the amount of transmit power that may be used in any given portion of BW (e.g., a PSD limit in any given 100 kHz of BW). In one possible embodiment, clocking ratio of a desired ratio (e.g., generally, N) is operative to generate any one of a number of different respective channels. For example, considering a 20 MHz channel, down clocking by a value of four (or five) would provide for 5 MHz channels (or 4 MHz channels) which would fit within the specified 6 MHz BW channels of the frequency spectra typically associated with TV channels.

Depending upon various consideration(s) (e.g., current operating conditions, currently existent broadcast TV within TV channel(s), interference, noise, environmental conditions, etc.), one particular frequency of channels may be desirable over one or more other frequencies. Also, depending upon any one or more of such considerations, including those described above, as well as the very stringent spectral mask requirements when operating using portions of the frequency spectra typically associated with TV channels may direct the selection of one particular frequency over others. For example, in certain situations, 4 MHz channels may be suitable and acceptable for effectuating be very stringent required spectral mask at the respective bandages of a 6 MHz channel within the frequency spectra typically associated with TV channels (e.g., a −55 dB attenuation may be able to be achieved at the 6 MHz band edges using 4 MHz channels). In another situation, 5 MHz channels may be suitable and acceptable for effectuating be very stringent required spectral mask at the respective bandages of a 6 MHz channel within the frequency spectra typically associated with TV channels (e.g., a −55 dB attenuation may be able to be achieved at the 6 MHz band edges using 4 MHz channels). However, there may be some situations in which either the design and/or implementation of a given WCD, or the current operating conditions, would require that channels of relatively narrower with be employed. For example, in some situations, relatively narrow channels, such as 2 MHz channels may be the widest channels that may be used while providing for suitable and acceptable operation including complying with the very stringent required spectral mask at the respective bandages of a 6 MHz channel within the frequency spectra typically associated with TV channels (e.g., a −55 dB attenuation may be able to be achieved at the 6 MHz band edges using 4 MHz channels).

As may be understood, when different respective widths are employed using different respective channels, particularly using operation based on OFDM, certain operational modes may provide for different respective numbers of tones and/or sub-carriers to be used. For example, such as with reference to FIG. 4, if the portion of the frequency spectrum employed based on an OFDM symbol is changed, so will the possible and/or available number of tones and/or sub-carriers change.

In one embodiment, in order to provide for an instance in which relatively larger percentages of a 6 MHz TV channel may be used (e.g., comparing and implementation using 5 MHz channels as opposed to 4 MHz channels), additional data sub-carriers may be employed within an alternative operational mode.

Figure 6:
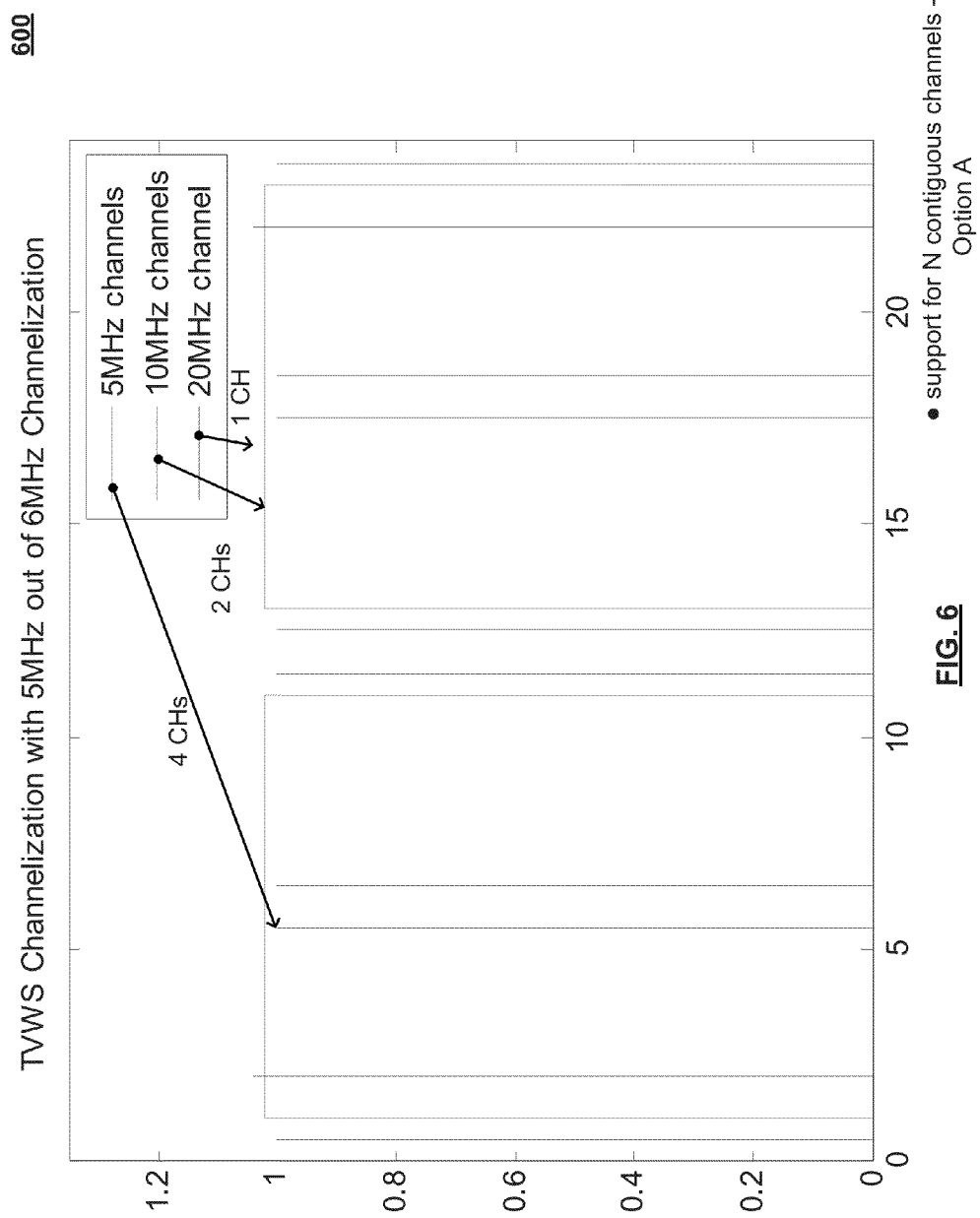
FIG. 6 illustrates an embodiment of an embodiment of support for a number of contiguous channels (e.g., contiguous channel support—option A).

FIG. 6 illustrates an embodiment of an embodiment 600 of support for a number of contiguous channels (e.g., contiguous channel support—option A). Operation based on IEEE 802.11ac supports operation of 20/40/80/160 MHz channels. If one channel occupies 5 MHz out of an available channel BW of 6 MHz, then 2 respective channels would correspondingly occupy 10 MHz out of an available channel BW of 12 MHz (e.g., two adjacent 6 MHz channels), and then 4 respective channels would correspondingly occupy 20 MHz out of an available channel BW of 24 MHz (e.g., adjacent 6 MHz channels).

Some embodiments may have different respective basic services sets (BSSs) employing different respective BWs may partially overlap with respect to one another, and the respective CDs therein may not be able to read the SIG field of different respective BSSs appropriately. That is to say, as seen with respect to this diagram, there may not be perfect alignment given the slight shifting with respect to the various channels, given that they are not perfectly overlapped one with respect to another. As such, all of the respective CDs may not correspondingly be able to hear, process, etc. all respective communications because they are being provided on different respective BWs that may have, in some situations, only partial overlap.

As such, a pure receiver based implementation may be implemented such that a receiver scans all respective frequency offsets in order to find the offset SIG field. That is to say, all respective frequency offsets are scanned in order to find the correct SIG field in the correct location. For example, considering certain assumptions as described above (e.g., 5/10/20 MHz channelization), the SIG field can be found in the middle of a 6 MHz channel, offset by ±500 kHz (e.g., due to 10 MHz channel), offset by ±1500 kHz (e.g., due to 20 MHz channel), and offset by ±1000 kHz (e.g., also due to 10 MHz channel in different location). If the signal BW is different than 5 MHz, the corresponding offset will be different but no one a priori and the receiver can then calculate all of the possible offsets in order to correctly decode the SIG field.

Figure 7:
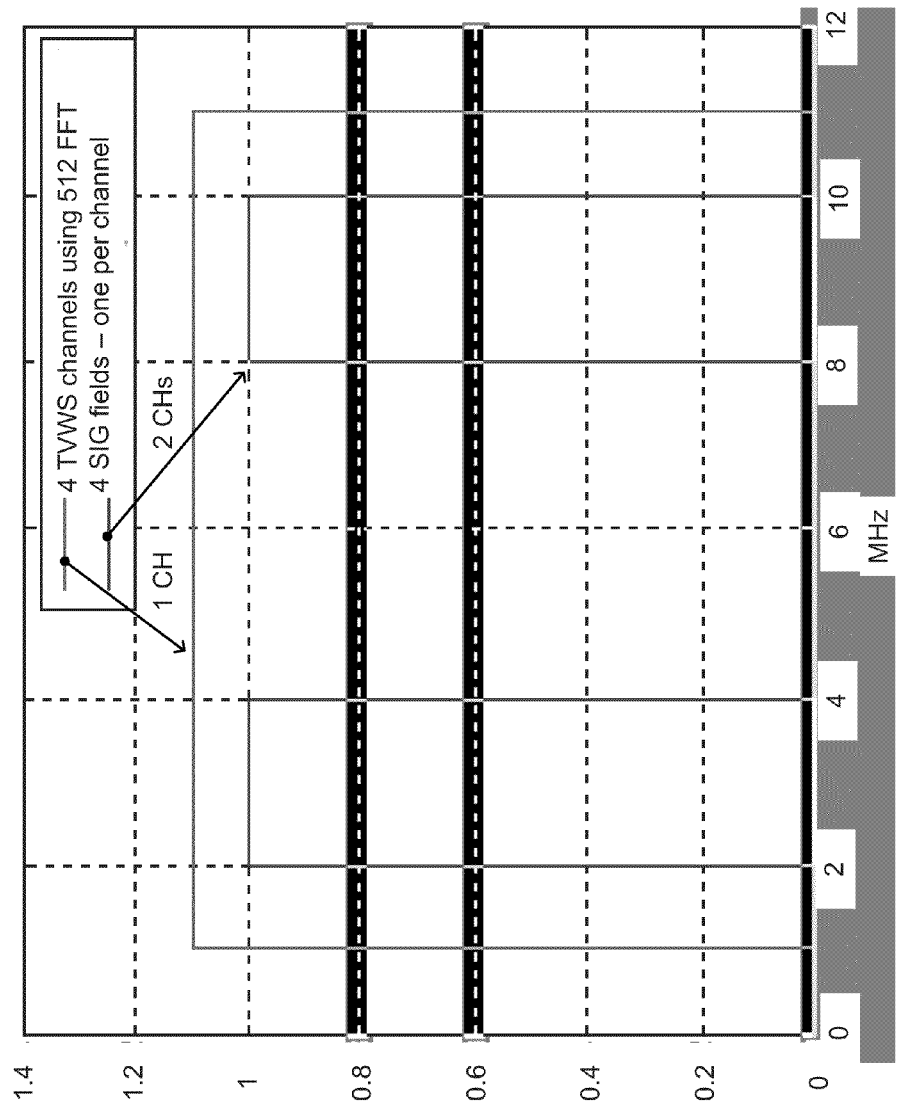
FIG. 7 illustrates an alternative embodiment of an embodiment of support for a number of contiguous channels (e.g., contiguous channel support—option B(1)).

FIG. 7 illustrates an alternative embodiment 700 of an embodiment of support for a number of contiguous channels (e.g., contiguous channel support—option B(1)). If using a 64 FFT with the down-clocking ratio N=4 (e.g., SIG field is not DUP'ed), then a down-clocking ratio N=8 may be employed for the SIG field in the LDS symbols preceding it with a down-clocking ratio N=8.

In addition, regardless of the BW used, modification of the SIG location may be made to ensure it lies in the given TV channel's center, or as close as possible within a given constraint. For example, this may be effectuated such that the constraint being that it sits on the OFDM tones which may not coincide with the center of each respective channel.

As may be understood with respect to this diagram in the following diagram, the SIG field may be modified to occupy a relatively more narrow BW, yet such that it always falls in the available channel BW's center (or as close to possible within a desired constraint). As such, even if data within a packet falls on one particular channel, then a receiver device will always be able to decode the SIG field based on such placement of the SIG field in the center of an available BW.

Figure 8:
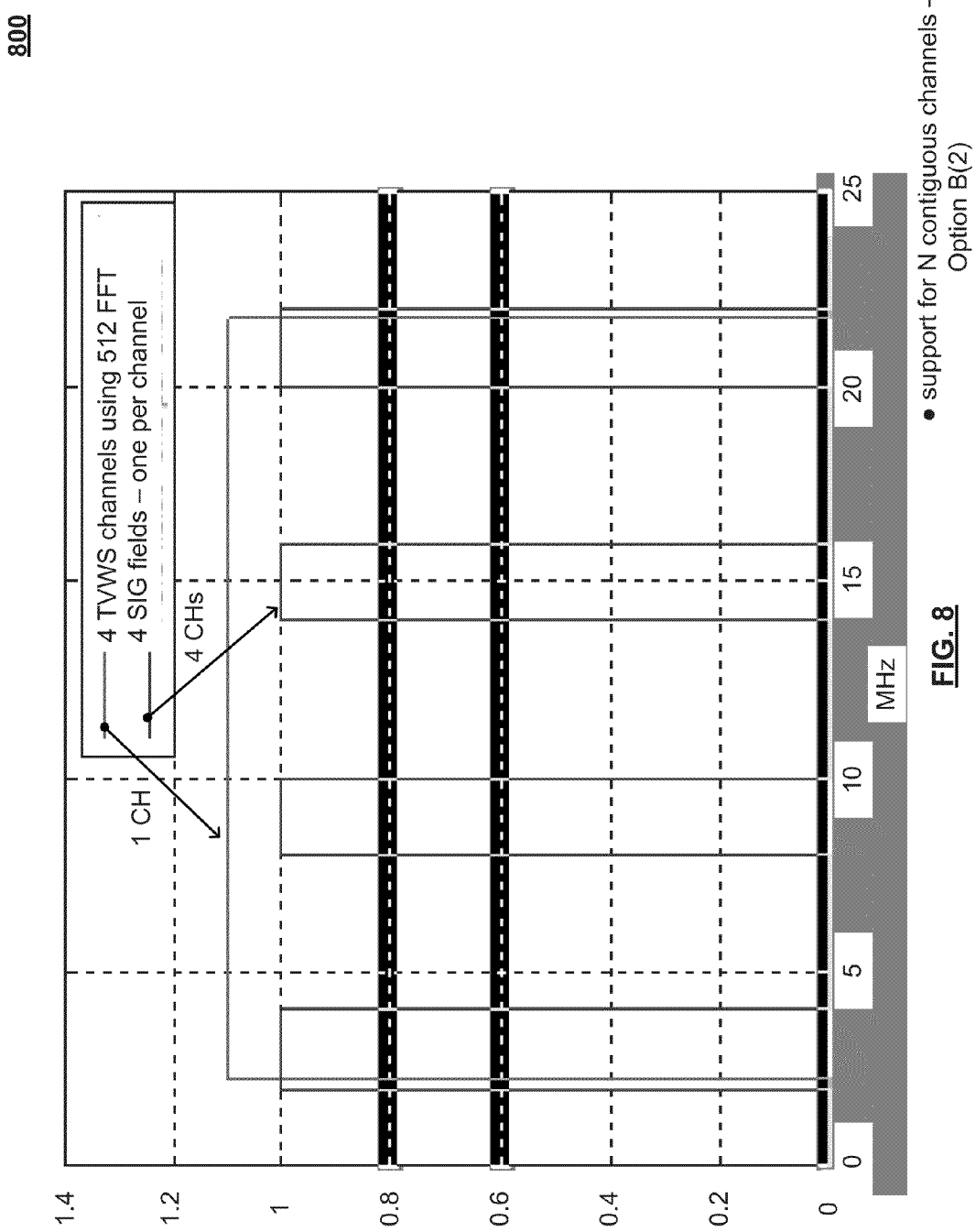
FIG. 8 illustrates yet another alternative embodiment of an embodiment of support for a number of contiguous channels (e.g., contiguous channel support—option B(2)).

FIG. 8 illustrates yet another alternative embodiment 800 of an embodiment of support for a number of contiguous channels (e.g., contiguous channel support—option B(2)). This diagram depicts an alternative embodiment including multiple respective SIG field each respectively having more narrow BW than the previous diagram.

A packet may be designed to start with the respective preamble fields (e.g., STF/LTF/SIG) located at the center of a channel regardless of the corresponding packet BW. That is to say, regardless of a BW associated with a given packet (which may be one of any of a number of possible packet BW), the respective preamble fields will be located at the center of the BW associated with that given channel. Such a receiver may employ a bandpass filter implemented therein to tune to the BW of different respective and available channel BWs to improve receiver sensitivity. Also, a given receiver will understand, based on the SIG field, what the packet BW of that particular packet is (e.g., one channel, to channels, for channels, etc.) and their particular location relative to the location of the SIG field. That is to say, based upon the location of the SIG field, the respective packet BW may also be deduced there from (implicitly in certain embodiments based on the location of the SIG field). For example, considering an implementation of four respective channels of the SIG field, the SIG field will convey the information +1, +2, +3 or −1, +1, +2 or −2, −1, +1 or −3, −2, −1 on the location of the channels relative to the channel containing the SIG. In such an example, before respective channels are relative to the channel on which the SIG field is conveyed (e.g., implicitly indicating the packet BW).

Figure 9:
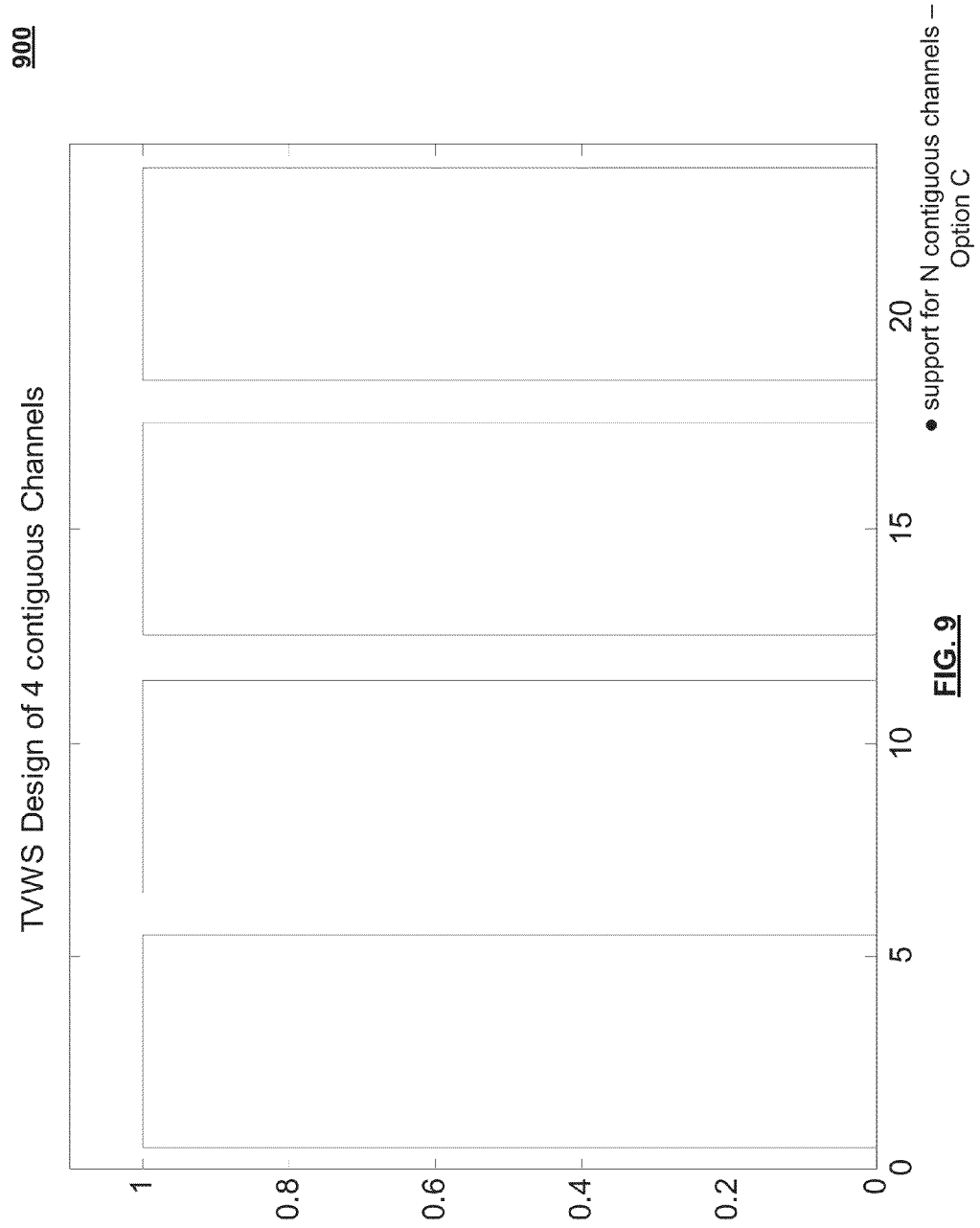
FIG. 9 illustrates yet an alternative embodiment of an embodiment of support for a number of contiguous channels (e.g., contiguous channel support—option C).

FIG. 9 illustrates yet an alternative embodiment 900 of an embodiment of support for a number of contiguous channels (e.g., contiguous channel support—option C). With respect to this diagram, the respective channels may be generated separately. For example, a unit of one channel may be employed as the basis for sending two or more contiguous channels. Operation based on this various allows for noncontiguous operation (e.g., two or more respective TVWS channels that are not necessarily adjacent one another, such that at least one other TVWS channel is intervening in between them). For example, there may be instances in which there is a fragmented spectrum availability (e.g., in urban areas), and it may make sense to design for two or more non-contiguous channels. Of course, contiguous channel transmission may also be effectuated in other embodiments or in embodiments employing noncontiguous channels as well.

In such an implementation, each respective channel (out of the N contiguous channels) may be filtered separately and then frequency offset to be positioned in the middle of the TVWS channel avoiding the offset issues described above with respect to option A and avoiding a different SIG field structure as an option B.

It is also noted that different respective modulation coding sets (MCSs) may respectively be employed for different respective channels (e.g., such as when those respective channels are noncontiguous). That is to say, certain channels may have relatively more interference than others, different propagation effects, etc., and adaptation among those respective channels as a function of MCS can allow for the least possible degradation in service.

Figure 10:
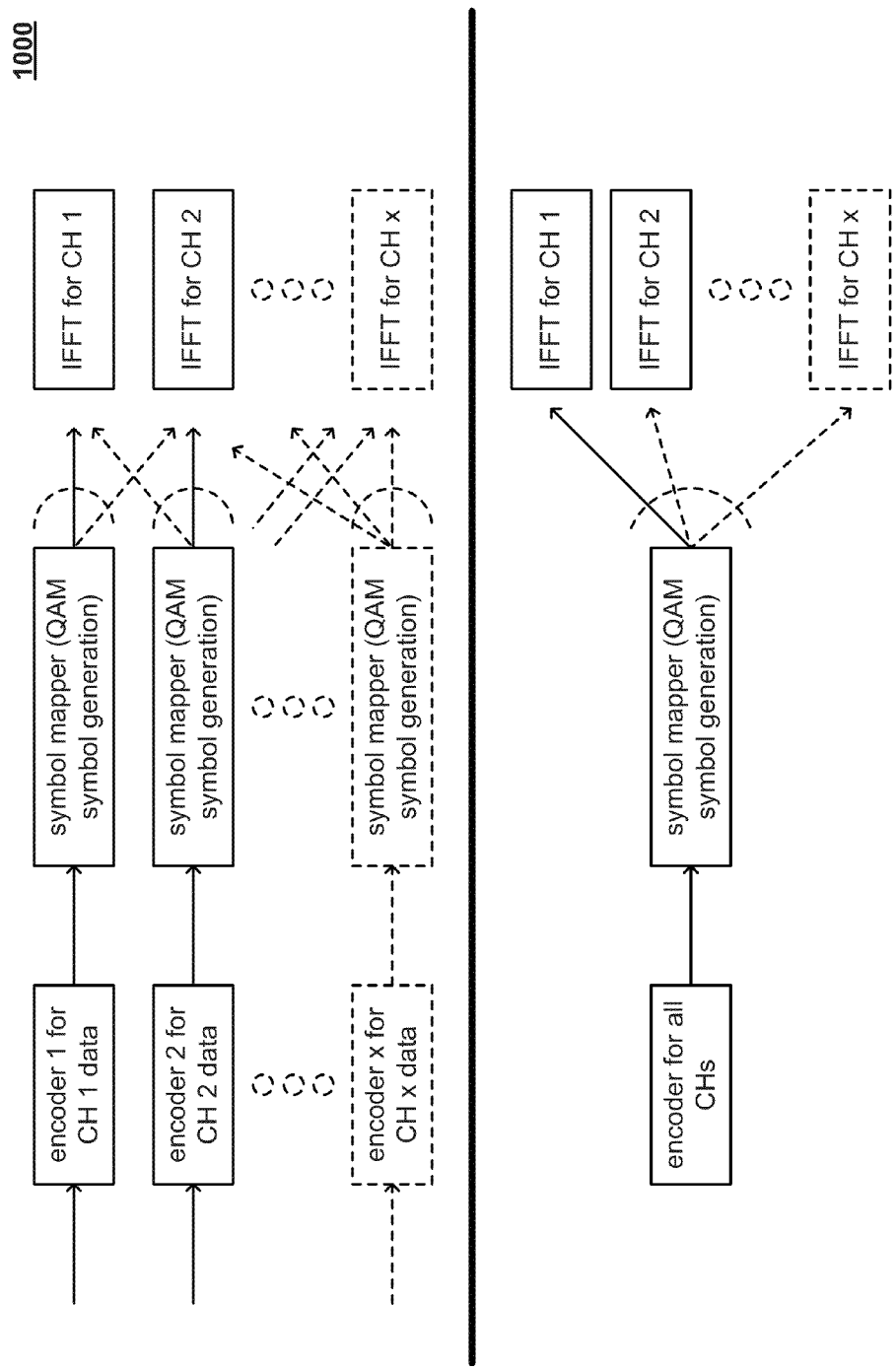
FIG. 10 illustrates an embodiment of packet generation to fit into a number of channels.

FIG. 10 illustrates an embodiment 1000 of packet generation to fit into a number of channels. There are a number of options for generating a packet to fit into a particular number of channels using one channel as a building block.

Option 1: Define two (or more) independent channels (contiguous or non-contiguous) that are not jointly encoded. They would then function as two independent channels with a common MAC but two or more independent encoders each generating the required information bits to fill its own channel. However, diversity may not be fully exploited in such an embodiment.

Option 2: Define per channel encoding allowing per channel MCS but also exploiting channel diversity. The PPDU encoding process is performed on a per-channel basis and all channels data is combined in the frequency mapping into tones. Mapping into tones is done such that each encoder output enjoys the diversity of all the available channels. A simple mapping into tones uses a round robin mapping whereby each encoder output is mapped into tones in all the channels (e.g. encoder one uses even tones on each channel and encoder 2 uses odd tones in each channel). The same round robin mapping can be used for 4 bonded channels whereby each encoder splits its output QAM symbols into each of the 4 channels.

Option 3: using the IEEE 802.11ac definition of segment parser (a segment refers to an 80 MHz channel), since each channel needs to be filtered separately, the segment deparser used for contiguous 80+80 mode needs to be removed and the transmitter should follow the same structure as with non-contiguous 80+80.

Option 4: instead of splitting bits at the encoder output by using a segment parser, an alternative embodiment may operate to optimize diversity by first mapping bits into QAM symbols and then splitting the symbols in a round robin fashion between the channels. Again, the same round robin mapping can be used for any number of bonded channels (e.g., two or more clusters or channels combined such as based on reference to FIG. 3).

However, the two previous options (Option 3 and 4) may be viewed as being somewhat limited as they both inherently assume the same MCS on each channel. In the developing IEEE 802.11af (which may be referred to as TGaf), unlike IEEE 802.11as (which may be referred to as TGac), channels may have considerably higher SNR difference and perhaps SINR difference due to TV channels interference—channels at VHF 200 MHz, UHF 500 MHz and 700 MHz will have different propagation and interference, considerably more than in the 5 GHz band. As such, it may be preferable to allow usage of different MCS for each channel (especially for non-contiguous operation) as described also above. As such, another option may be employed.

Option 5: similar to option 1 except that the interleaved encoded bits of the two or more channels are first mixed together based on the ratio of Nbpsc (number of coded bits per sub-carrier 1, 2, 4, 6 or 8) in each channel. For example, if one channel uses 16 QAM (Nbpsc=4) and one channel uses 64QAM (Nbpsc=6), the new bit stream contains 4 bits from the encoder of channel 1, followed by 6 bits for the encoder of channel 2, etc.

With respect to signaling of the occupied BW, unlike the IEEE 802.11ac standard, where channel location is uniquely defined (e.g., the first 80 MHz channel occupies the first four 20 MHz channels, the second 80 MHz channel occupies the second group of 4 20 MHz channels—in other words, there is no overlap between 40, 80, or 160 MHz channels), TVWS channel availability varies from location to location.

As such, when transmission on several contiguous channels occurs, signaling of which exact channels are utilized may be made as a device initially tuned to one channel can't assume it knows which channels are used. This is achieved by conveying the following information in the SIG field: BW—one channel, two channels, four channels, etc.

The exact location relative to the location of the SIG field (for example in case of four channels the SIG field will convey the information +1, +2, +3 or −1, +1, +2 or −2, −1, +1 or −3, −2−1 on the location of the channels relative to the channel containing the SIG). It is noted that if 4 channels are bonded, the SIG field on each channel will not have the exact same info since each channel has a different location relative to the 4 bonded channels.

Figure 11:
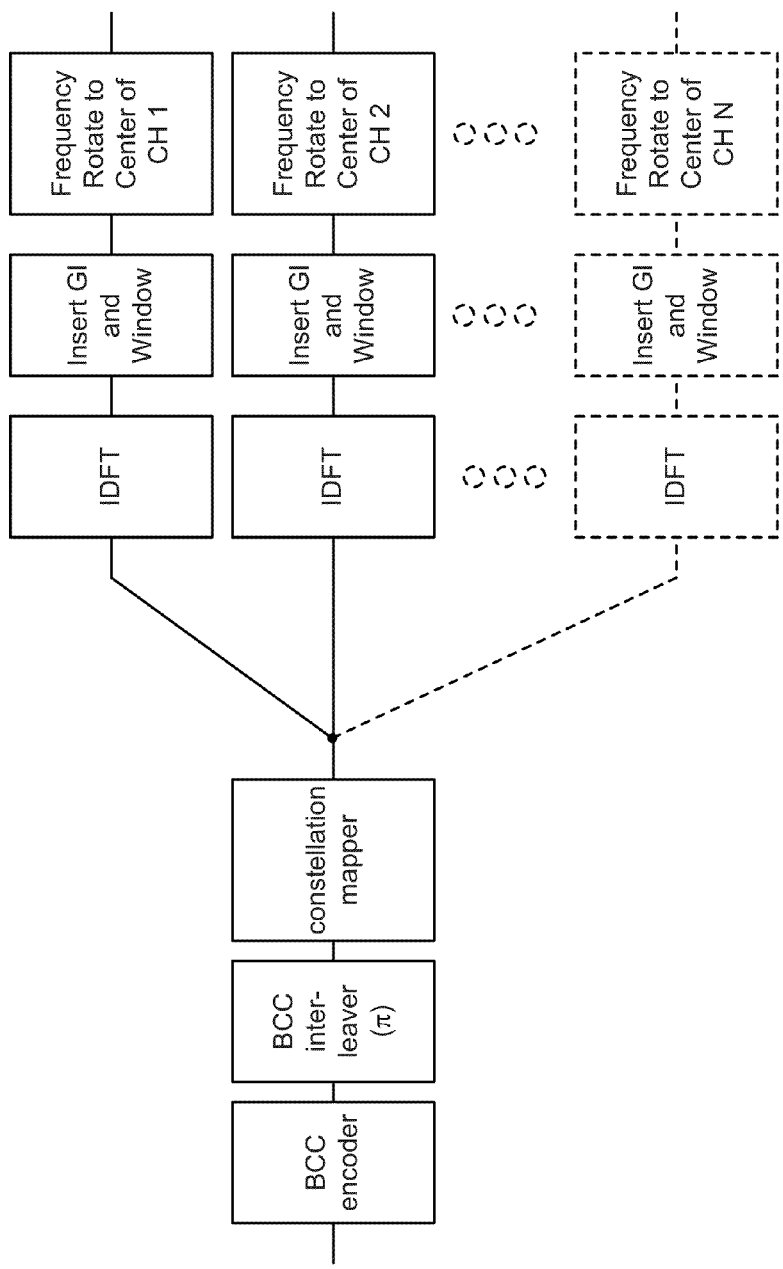
FIG. 11 illustrates yet another embodiment of support for a number of contiguous channels (e.g., contiguous channel support—option C, variant 2).

FIG. 11 illustrates yet another embodiment 1100 of support for a number of contiguous channels (e.g., contiguous channel support—option C, variant 2). As may be seen with respect to this diagram, an interleaver may be employed to split the respective bits output from an encoder between different respective channels regardless of whether the transmission is to be effectuated using contiguous or non-contiguous channels. With respect to the particular forward error correction (FEC) shown here in this to good diagram as well as other embodiments and are diagrams herein, binary convolutional code (BCC) is one possible FEC which may be employed. Of course, other FEC's may alternatively be employed within other embodiments. In addition, while one particular encoder one interleaver are pictorially illustrated with respect to this diagram, it is of course of the multiple encoders and interleavers may alternatively be used if the data rate cannot effectively be supported by one encoder.

As shown in this diagram, a BCC encoder is implemented to encode at least one information bit to generate a plurality of encoded bits. A BCC interleaver (π) is implemented to split the plurality of encoded bits between the different respective channels, again, regardless of whether or not the transition is to be effectuated using contiguous or non-contiguous channels.

The outputs from the constellation mapper include a plurality of signal pathways that each respectively have a corresponding and respective inverse discrete fast Fourier transform (IDFT) processor or module, a corresponding respective insert guard interval (GI) and window processor or module, and a corresponding and respective frequency rotate to center of channel processor module. For example, as described with respect to certain particular embodiments herein, each respective channel may be centered in the available TVWS channel via which at least a portion of the transmission is to be made.

The basic channel unit employed within such an implementation may have an FFT size of any particular desired number (e.g., FFT size of 64, 128, 256, etc.), and is repeated as many times as there are respective channels via which the transmission is to be effectuated. In this particular diagram, all of the respective channels are bound together using the common encoder and interleaver. Mapping of the respective bits streams that have been split an output from the interleaver is performed using a constellation mapper. Constellation mapper may be viewed as mapping bit labels (e.g., groups of bits) to at least one constellation having at least one corresponding mapping of the constellation points therein. As may be understood, given constellation includes a number of constellation points such that each respective consolation point therein corresponds to one particular bit label. In certain embodiments, mapping of the constellations (e.g., which may be effectuated using constellations of any particular desired shape including quadrature amplitude modulation (QAM), etc.) is performed sequentially from the lowest tone of the lowest channel passing all of the tones of one channel, and then proceeding to the next channel and finishing at the highest tone of the highest channel. Generally, such constellation mapping is effectuated across all of the respective tones which will be employed for transmission based on OFDM signaling. Also, alternative respective tone mappings and ordering thereof may be employed in alternative embodiments.

As may be understood with respect to this diagram, operation performed according to such an implementation may be viewed as performing a same encoding process as if all of the channels were combined together with one large IDFT.

Figure 12:
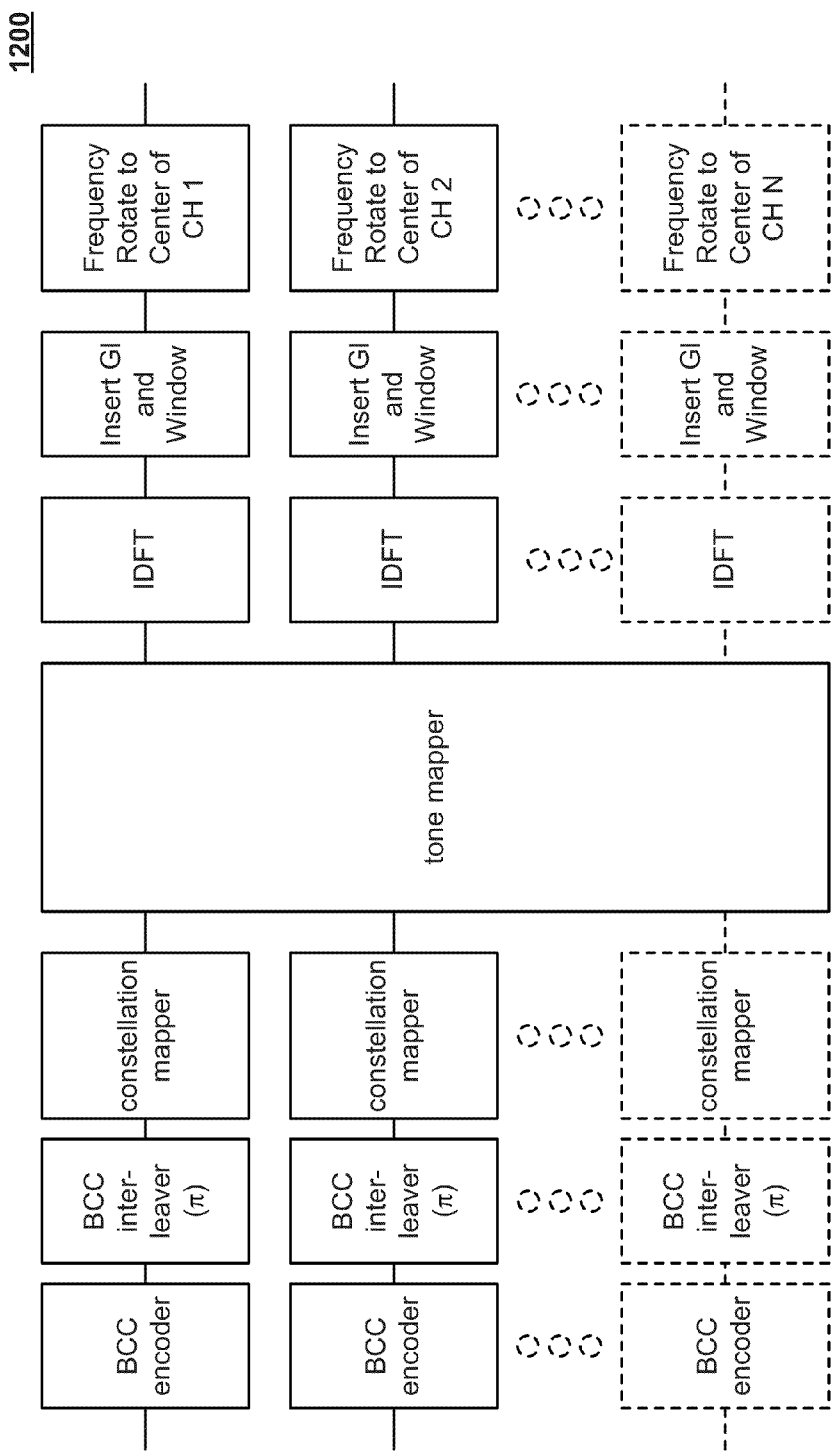
FIG. 12 illustrates yet another embodiment of support for a number of contiguous channels (e.g., contiguous channel support—option C, variant 3).

FIG. 12 illustrates yet another embodiment 1200 of support for a number of contiguous channels (e.g., contiguous channel support—option C, variant 3). As may be understood with respect to this diagram, each respective channel has its own encoding process, and there is a tone interleaver that mixes up the symbols (e.g., QAM symbols) to be provided into the respective channels. Any desired manner may be employed to mix the symbols and the respective channels (e.g., in a round robin approach in certain embodiments).

For example, in one possible embodiment, a round robin tone mapper may be operative to take the first QAM symbol from the first encoder in place that symbol in the lowest-most tone of the lowest IDFT. Then, such a round robin tone mapper may be operative to take the first QAM symbol from the second encoder and place it on the next tone, and so on. Generally speaking, such a round robin tone mapper may be viewed as selectively mapping the respective QAM symbols output respectively from the various encoders in each of the respective tones.

As may be understood, such an implementation provides diversity by allowing the encoded bits output from each respective encoder to be placed on all of the respective channels by which the transmission is to be made. For example, based on performing such tone mapping, encoded bits output from each of a first encoder, a second encoder, etc. will be placed on all of the respective channels by which the transmission is to be made.

Considering an illustrative example for a specific round robin tone mapper with four channels each being implemented using a 128 FFT (108 DATA toned), by defining the tone numbering for the first channel as 1:108, the tone numbering for the second channel as 109:216, etc., then such a round robin tone mapper will position the QAM symbols coming out of the various respective encoders as follows: QAM symbols (1) from the first encoder on tones 1, 5, 9, ..., 109, ...; (2) from the second encoder on tones 2, 6, 10, ..., 110, ...; (3) from the third encoder on tones 3, 7, 11, ..., 111, ...; (4) from the fourth encoder on tones 4, 8, 12, ..., 112, ....

Figure 13:
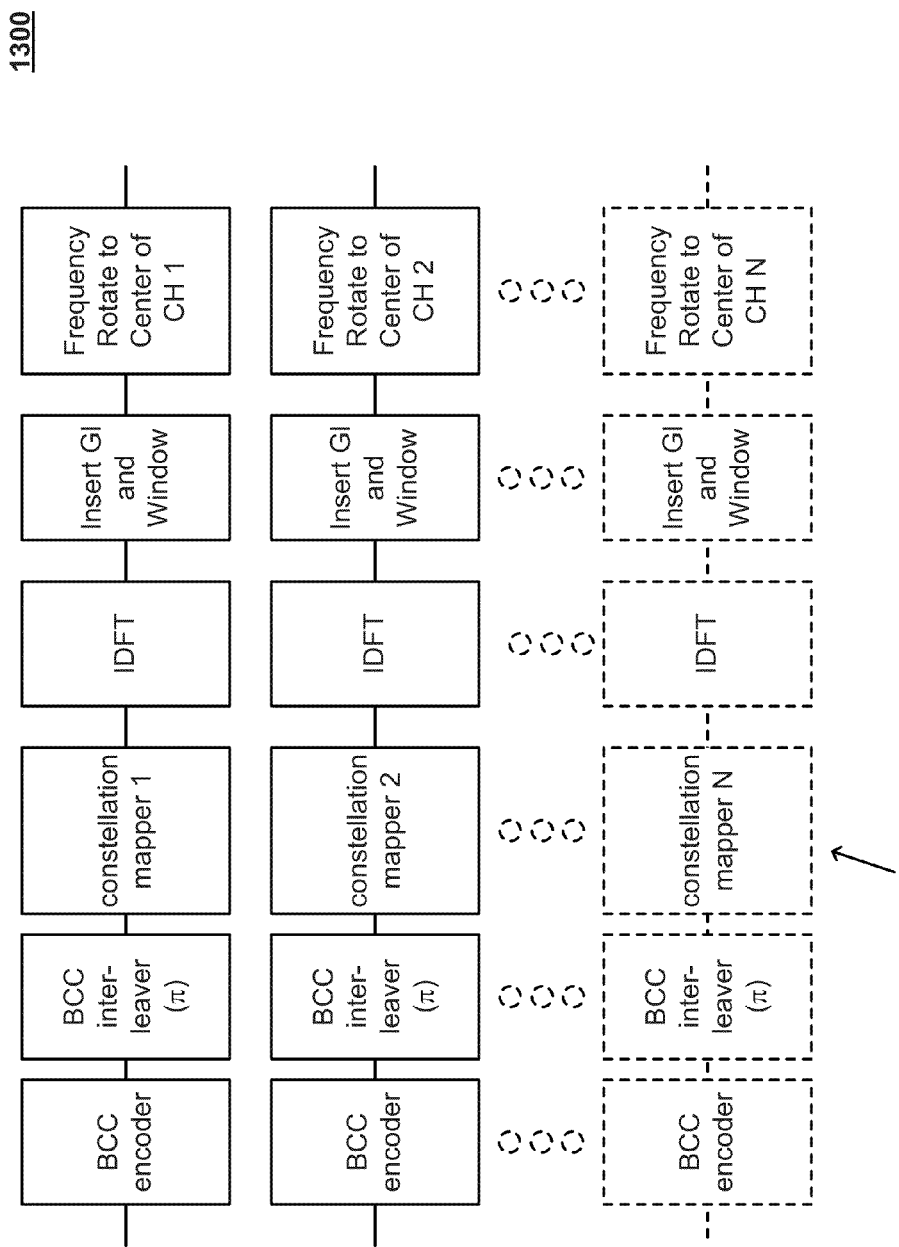
FIG. 13 illustrates yet another embodiment of support for a number of contiguous channels (e.g., contiguous channel support—option C, variant 4).

FIG. 13 illustrates yet another embodiment 1300 of support for a number of contiguous channels (e.g., contiguous channel support—option C, variant 4). When comparing the implementation of this diagram to certain previous embodiments, it may be understood that certain of the previous embodiments have some limitations when implemented using the same modulation coding set (MCS) on each respective channel. Of course, even with respect to certain of the previous embodiments, different respective MCS's may be employed with respect to different respective channels, such that appropriate handling of the different respective MCS's is made with respect to other portions of the architecture.

In the developing IEEE 802.11af, certain respective channels may have considerably higher signal to noise ratio (SNR) difference and possibly signal to interference noise ratio (SINR) due to the inherent characteristics (e.g., interference) which may be associated with TV channels in some situations. For example, channels implemented at VHF 200 MHz, UHF 500 MHz and 700 MHz will have different respective propagation and may suffer from different (e.g., more) interference than channels implemented within the 5 GHz band. That is to say, channels implemented based on the developing IEEE 802.11 af may unfortunately suffer deleteriously from different characteristics than channels implemented based on other IEEE 802.11 related standards, protocols, and/or recommended practices.

In certain embodiments, different respective MCS's may be employed respectively for different respective channels. For example, a different respective MCS may be employed for each respective channel. Such different respective MCS operation may be employed for both contiguous and non-contiguous operational modes. If multiple MCS's are allowed, the feedback from a receiver CD may be operative to allow a given receiver CD (e.g., STA) to feed multiple MCS's, one per channel, and the SIG field may be implemented to signal the correct MCS per channel. For example, instead of operating such that only one MCS is used, as in certain currently deployed Wi-Fi-based designs, different respective MCS's may be employed for different respective channels.

With respect to the signaling of the different respective MCS's to ensure appropriate coordination between various respective CDs, a number of different respective means may be employed. For example, in certain embodiments, each respective SIG field carries the MCS of its respective channel. In other desired embodiments, all of the respective SIG fields for all of the respective channels are identical, and they are operative to carry all MCS information for all of the respective channels (though such an implementation may be properly understood as having relatively more overhead than having each respective SIG field carry the MCS of its respective channel). In such an embodiment, the overhead may be reduced by feeding back only a Delta (Δ) or difference of the MCS per channel relative to a predetermined channel than feeding back the MCS of that predetermined channel. That is to say, rather than feeding back the entirety of information associated with the MCS, the only information that would need to be fed back would be the difference between the MCS of a given channel and predetermined MCS information (e.g., such as corresponding to an MCS relative to a predetermined channel).

In addition, with respect to the implementation of the sticker diagram, it may be understood that this implementation includes N independent channels (which may be implemented as contiguous or non-contiguous channels) that are not jointly encoded. That is to say, they function as N independent channels with the common media access control (MAC), but N or more independent encoders are implemented each generating the required encoded bits to fill the channel corresponding thereto. As may be understood, diversity within such an implementation may not be exploited to a sufficiently high or desirable degree when compared to other particular embodiments. However, in some instances, diversity may not be a particularly important design constraint (e.g., considering those implementations in which the MCS for each respective channel is adapted to the conditions of that respective channel).

Figure 14:
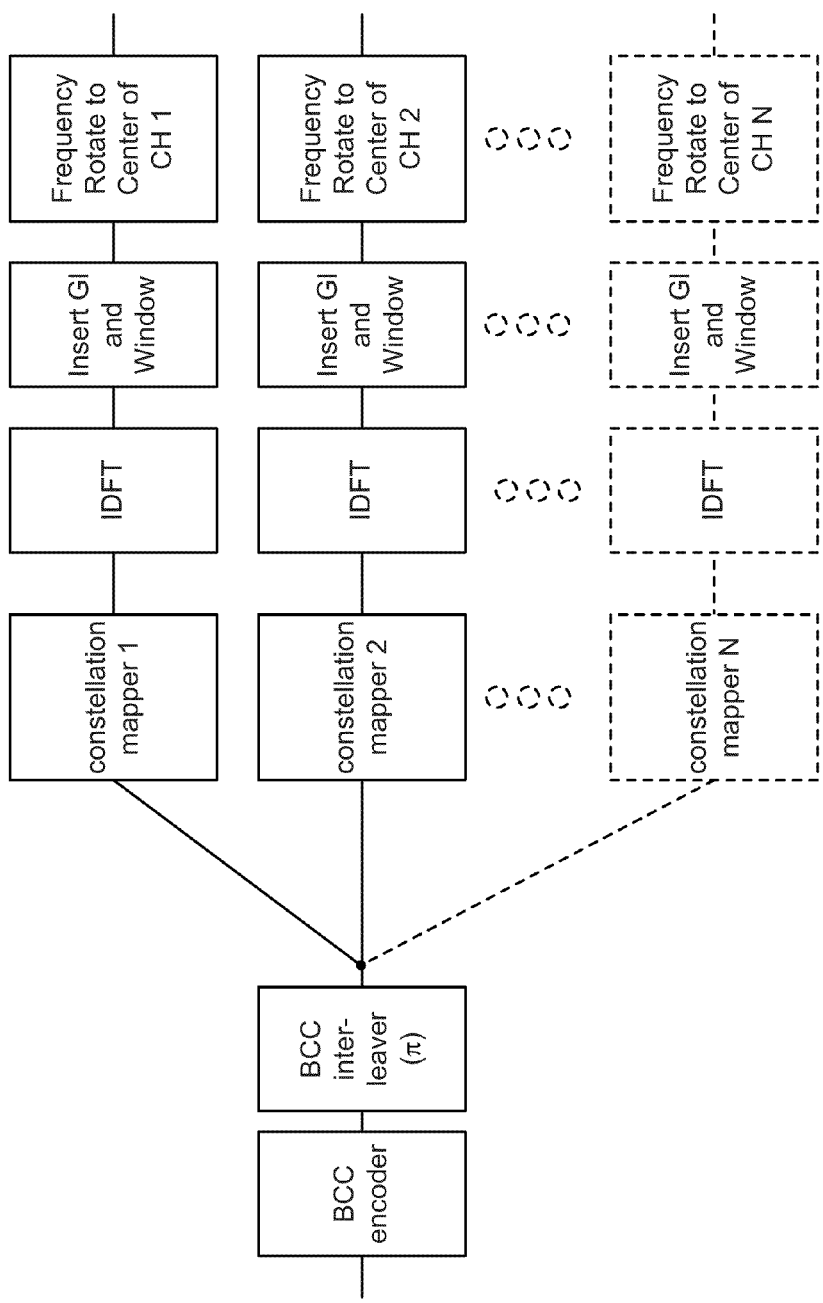
FIG. 14 illustrates yet another embodiment of support for a number of contiguous channels (e.g., contiguous channel support—option C, variant 5).

FIG. 14 illustrates yet another embodiment 1400 of support for a number of contiguous channels (e.g., contiguous channel support—option C, variant 5). Generally, the implementation corresponding to this diagram may be viewed as being a combination of at least two of various previous embodiments. For example, as may be seen with respect to this diagram, a different MCS may be allowed for each respective channel (e.g., as may be understood with respect to the plurality of constellation mappers that receive the output from the interleaver). As is also employed with respect to at least one previous embodiment, an interleaver may be employed to split the respective bits output from an encoder between different respective channels regardless of whether the transmission is to be effectuated using contiguous or non-contiguous channels.

For example, with respect to this diagram, each of the respective constellation mappers may map the bits output from the interleaver to a number of different respective modulation (e.g., a constellation having a plurality of constellation points therein having a corresponding mapping). In addition, in certain embodiments, each respective constellation mapper need not necessarily be static in terms of its constellation mapping. That is to say, any of the constellation mappers depicted within such a diagram may adaptively modify the particular modulation employed as a function of time. For example, a given constellation mapper may map according to a first modulation or MCS (a first constellation having a first number of constellation points having a first corresponding mapping) during a first time, and that same constellation mapper may map according to a second modulation or MCS (a second constellation having a second number of constellation points having a second corresponding mapping) during a second time, etc.

In addition, it is noted that while a singular encoder is depicted within this diagram, multiple encoders may alternatively be employed in alternative desired embodiments. The encoder operates (or multiple encoders operate) at the sum rate of all of the respective channels. Again, each respective channel may have its own respective MCS. As may be understood with respect to such an implementation, the particular interleaver employed is operative to accommodate all possible combinations of the different respective MCS's on each respective channel. That is to say, as may be understood with respect to such an implementation, appropriate coordination is made with respect to the various processors and/or modules within such an architecture to ensure appropriate operation among all of the respective components. Moreover, within an architecture that is adaptively or configurably operative (e.g., may operate based on different respective configurations, settings, adaptations, with respect to one or more of the respective processors and/or modules therein), appropriate coordination must be made with respect to the interleaver and/or other components therein to accommodate all possible combinations of the different respective MCS's on each respective channel. For example, in one particular embodiment, with respect to operation of such an interleaver implemented to accommodate all possible combinations of the different respective MCS's on each respective channel, bits are appropriately mapped to a given constellation mapper with a size that may be different for different respective channels in a sequential order from the lowest tone of the lowest channel to the highest on the highest channel. Also, alternative respective mappings of bits to the different respective constellation mappers may be employed in alternative embodiments.

In addition, it is noted that various of the embodiments and/or diagrams herein are pictorially illustrated with respect to a singular spatial stream. However, the reader will properly understand that such embodiments and/or diagrams may be extended to multiple spatial stream implementations without departing from the scope and spirit of the invention. That is to say, any particular embodiment and/or diagram depicted herein, and/or their equivalents, may be readily extended to multiple spatial stream embodiments. Generally speaking, when comparing a singular spatial stream to a number of spatial streams, the extension may be viewed as adding yet another dimension via the spatial the pension, such that a similar or analogous architecture may be implied respectively to each of the various spatial streams.

Figure 15:
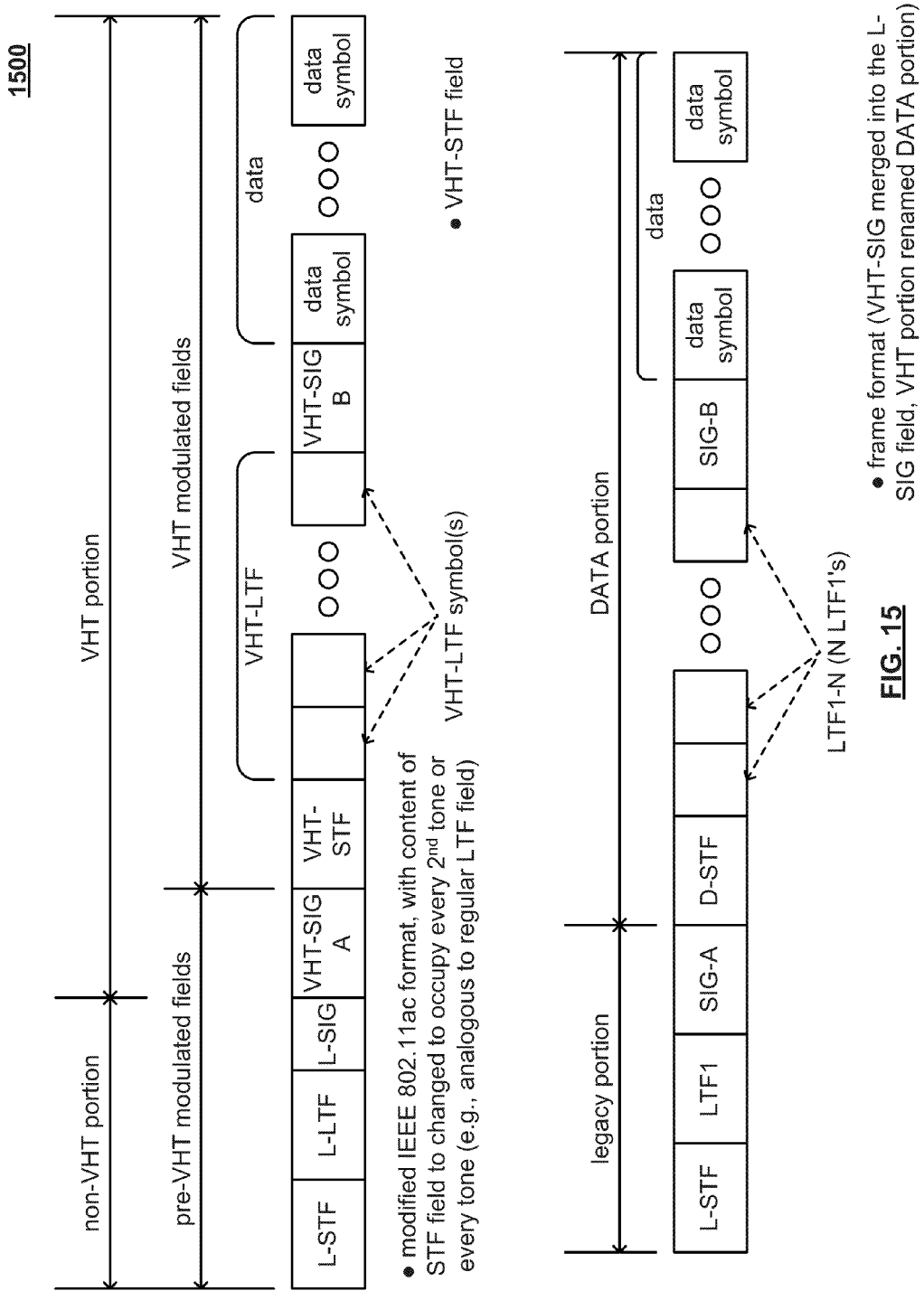
FIG. 15 illustrates an embodiment of a packet frame format with a modified STF field structure.

FIG. 15 illustrates an embodiment 1500 of a packet frame format with a modified STF field structure. In the TVWS spectrum, various regulations limit the transmit power spectral density (PSD) that may be employed in each respective narrow slice of the BW (e.g., 100 kHz). As such, a particular frame format that does not have constant or relatively constant power across the respective frequencies thereof may require its respective transmitter to reduce its power to meet the PSD limit.

For example, in certain embodiments, the STS field occupies only every fourth tone, the result of which can create high-frequency domain peaks. The L-STF may be implemented accordance with that structure in order to perform packet acquisition, but the VHT-STF is mainly used for automatic gain control (AGC), and doesn't necessarily need or require that particular structure. As such, a modification of the frame format may be made such that the content of that particular field may be implemented to occupy every second tone or every tone in a similar manner to the regular LTF field. For example, the STF field may be modified to occupy every second tone or every tone instead of occupying only every fourth tone, the result of which can create high-frequency domain peaks.

For reference to the reader, a frame format analogous to a frame format associated with IEEE 802.11ac is pictorially illustrated at the top of the diagram. A new frame format may be implemented based on the frame format pictorially illustrated at the bottom portion of the diagram such that the VHT-SIG field may be merged into the L-SIG field. If desired, with reference to the frame format patrol illustrated bottom portion the diagram, the VHT portion may be renamed as being a DATA portion. Such a frame format may be operative to provide compatibility with other respective IEEE 802.11 related standards and/or developing standards (e.g., IEEE 802.11ah).

As may be desired, different respective FST choices may be employed (e.g., 64 FFT, 128 FFT, etc.). In certain embodiments, one particular FFT may be selected for one channel. For example, considering at least two respective FFT options employed (e.g., 64 FFT, 128 FFT), the 128 FFT option may be preferable in certain situations such as to provide support for the delay spread associated with cellular offload applications and to support for sharp filtering which may be required to meet certain spectral mask requirements (e.g., as may be understood with reference to the very stringent spectral mask requirements described above with respect to operation associated with TVWS channels). As such, certain embodiments may operate such that the same FFT size may be used for different respective TVWS channels having different respective BWs (e.g., 6 MHz channels, 8 MHz channels, etc.). As may be understood different respective sampling frequencies may be employed when operating on different respective TVWS channels having different respective BWs.

As may be understood with respect to the developing IEEE 802.11af standard, this particular developing standard does not necessarily deal with 'legacy' type devices operative based on the standard (e.g., this developing standard may be viewed as that which will effectively become the very first Wi-Fi related standard associated with TVWS channels, and future improvements/changes which may be effectuated due to a variety of reasons, such as regulatory changes, may use a legacy portion of this particular developing standard for backward compatibility). For example, considering the various countries, jurisdictions, etc. in regards to such regulatory authority, it is presently unclear as to the amount of regulatory oversight, change, etc. which may be effectuated within various countries, jurisdictions, etc. As such, as may be understood with respect to various embodiments under diagrams herein, much consideration has been made in order to leave enough reserved bits available for accommodating future developments (e.g., regulatory changes, etc.).

Figure 20:
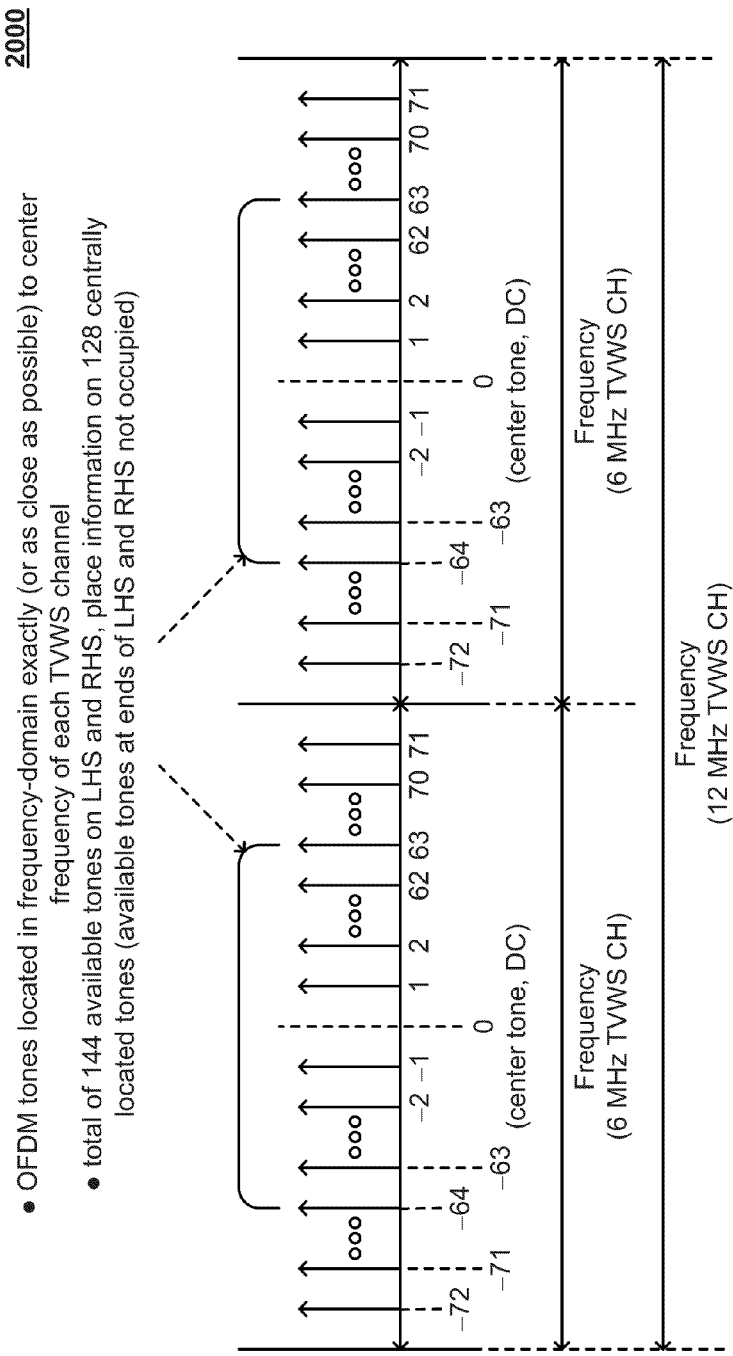
FIG. 20 illustrates an embodiment of support for a number of contiguous channels based on centrally located information among a number of available tones within two adjacent TVWS channels.

With respect to such frame format as depicted in the lower portion of the diagram of FIG. 20, the STF field may be implemented using two symbols modulated by the sequence used to modulate the 64 FFT structure. The sampling frequency for the STD field may be the same as for the rest of the packet. By employing the 64 FFT structure, packet acquisition may be made based on currently operative IEEE 802.11 devices. In addition, it is noted that since the STF is a time domain signal that doesn't require an FFT, there need not necessarily be a requirement for two or more respective FFT sizes. The LTF field may be implemented to include two 128 FFT symbols modulated based on the VHT-LTF field based on IEEE 802.11 ac.

FIG. 16 illustrates an embodiment 1600 of a signal field (SIG) format. With respect to the SIG field, the SIG field may be implemented using one 128 FFT symbols supporting up to 54 information bits. It is noted that one channel may be viewed as the minimum TVWS unit, and the duplicated (DUP) structure is not necessarily needed. For example, when the DUP structure is not used, there will not be an associated and corresponding reduction of throughput. The proposed SIG field content may be viewed as having certain similarities to the SIG field according to the developing IEEE 802.11ah. At least some differences with comparison to the developing IEEE 802.11ah include modifying the length field and the number of supported spatial streams within the novel and propose SIG field content based on the developing IEEE 802.11af.

Figure 22:
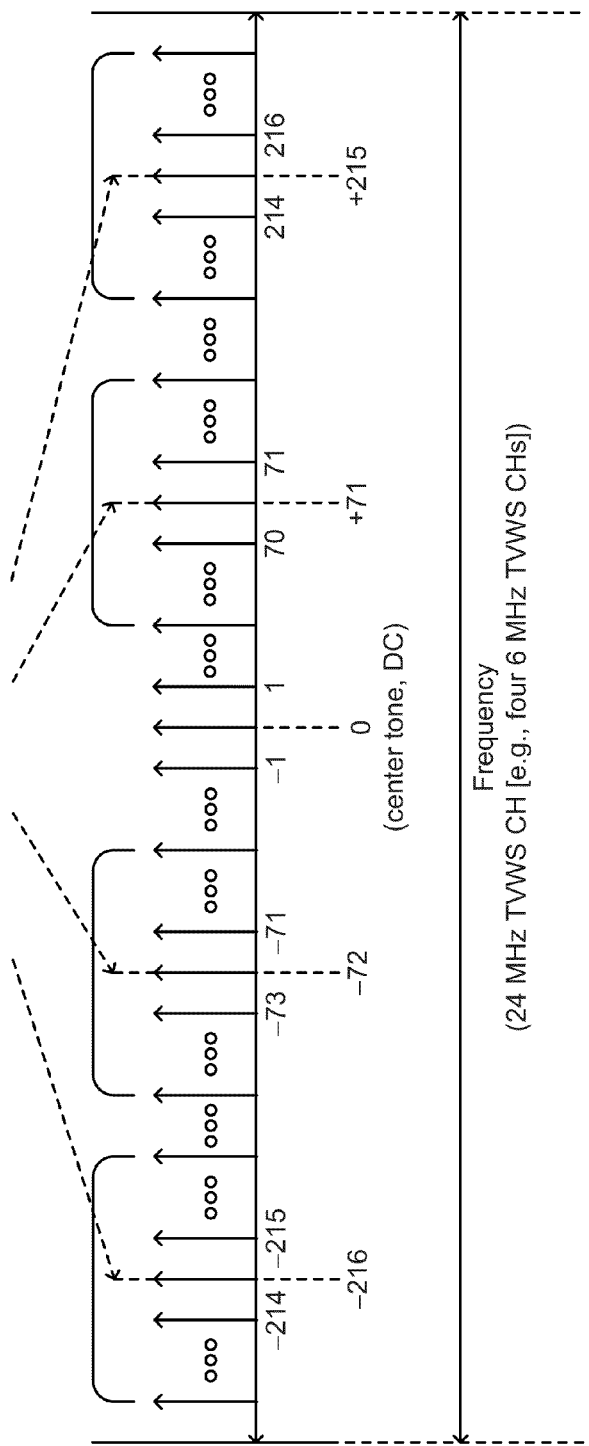
FIG. 22 illustrates an embodiment of support for a number of contiguous channels based on centrally located information among a number of available tones within four adjacent TVWS channels.

In certain embodiments, no more than four respective spatial streams may be employed when operating based on the developing IEEE 802.11af (e.g., such as operating based on the four respective channels depicted within FIG. 22). The reader is referred to the developing IEEE 802.11ah specification framework document (1137) for exact definitions of certain of the fields depicted within the table of this diagram.

Figure 17:
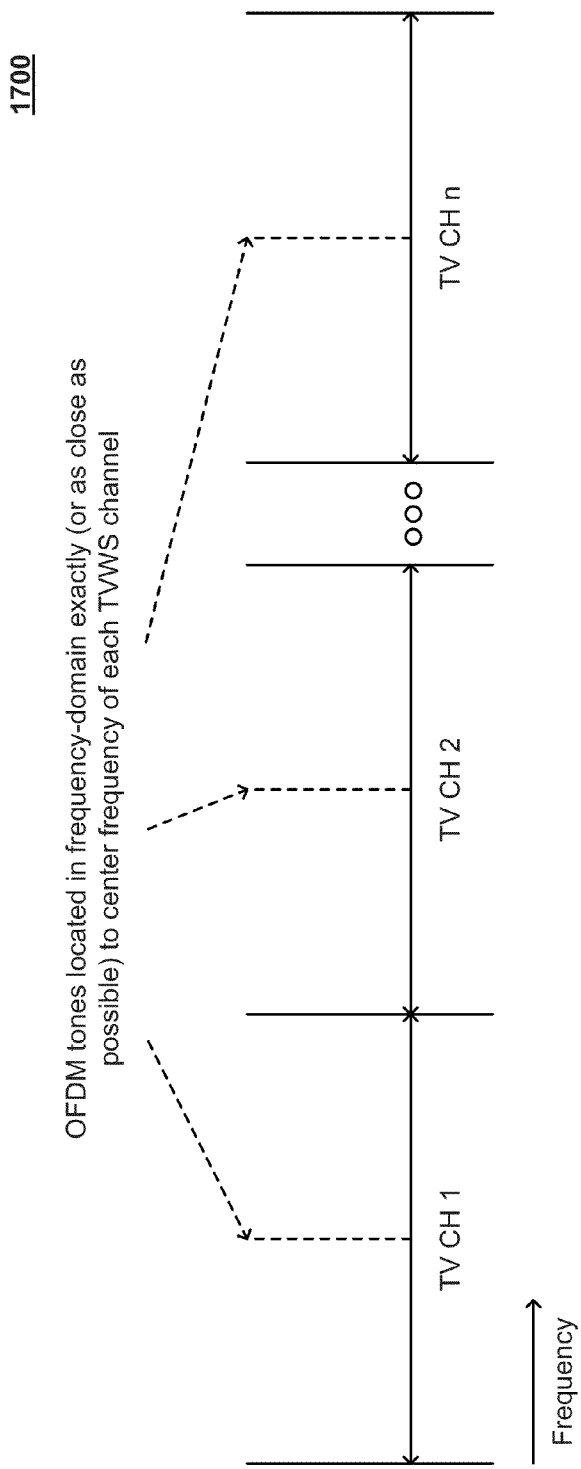
FIG. 17 illustrates yet an alternative embodiment of support for a number of contiguous channels (e.g., contiguous channel support—option D).

FIG. 17 illustrates yet an alternative embodiment 1700 of support for a number of contiguous channels (e.g., contiguous channel support—option D). Based on operation via this option, the locations of the tones in the frequency domain are made (e.g., such as based on the tone mapper) such that they are placed or fall exactly (or as close as possible) to the respective center frequency of each respective TVWS channel. That is to say, any information to be transmitted within a given TVWS channel is placed among tones centrally located around the center frequency of that given TVWS channel.

For example, a receiver CD may be implemented to detect one channel only or multiple channels. The operation of such a receiver CD may be such that it performs initial carrier frequency offset (CFO) correction to correct for any existent parts per million (ppm) offset plus a small frequency offset up to a half a tones spacing (e.g., with the correct placement of the tones) due to the signal position potentially not being centered exactly in the middle of a given TVWS channel.

By ensuring that the information is included upon centrally located tones within the available tones within one or more given TVWS channels, a CD may be implemented to use only one inverse fast Fourier transform (IFFT) or inverse discrete fast Fourier transform (IDFT) [e.g., such as in the case of a transmitter CD or a transmitter portion of a CD] and to use only one fast Fourier transform (FFT) or discrete fast Fourier transform (DFT) [e.g., such as in the case of a receiver CD or a receiver portion of a CD].

For example, in operation accordance with this implementation, instead of employing a number of small per-channel IFFT/IDFT [e.g., transmitter] or FFT/DFT [e.g., receiver], a singular implemented IFFT/IDFT [e.g., transmitter] or FFT/DFT [e.g., receiver] may be employed. It is of course noted that a possible variant of this particular implementation may include multiple respective per-channel channel IFFT/IDFT [e.g., transmitter] or FFT/DFT [e.g., receiver] even when the information is included upon centrally located tones within one or more given TVWS channels.

As may be seen with respect to this diagram, within the one or more respective TVWS channels, there may be a number of available tones for use. However, any information will be placed upon a number of centrally located tones within the total number of available tones, and those being centrally located around a center frequency of each of the respective one or more TVWS channels.

Figure 18:
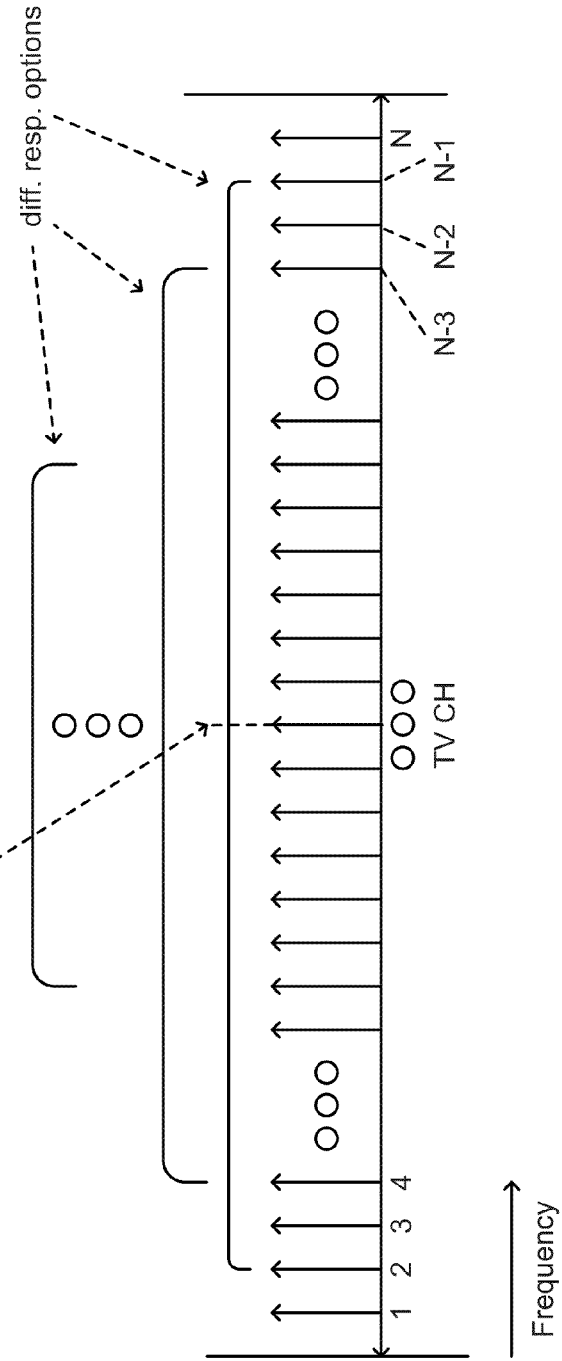
FIG. 18 illustrates an embodiment of support for a number of contiguous channels based on centrally located information among a number of available tones within a TVWS channel.

FIG. 18 illustrates an embodiment 1800 of support for a number of contiguous channels based on centrally located information among a number of available tones within a TVWS channel. Generally speaking, considering a number of available tones within a given TVWS channel (e.g., N=144), then a subset of those available tones may be used to carry information. At each respective end of that given TVWS channel, there may be one or more respective tones that are unoccupied.

Generally speaking, any of a number of desired subsets of tones may be employed with respect to a number of available tones within a given TVWS channel. For example, different respective sub-BWs of the available BW of a given TVWS channel (e.g., 6 MHz, 8 MHz, or some other available TVWS channel BW) may be employed to support such communications. In addition, adaptation may be made such that a first sub-BW of the available BW of a given TVWS channel may be employed at a first time, a second sub-BW of the available BW of that given TVWS channel may be employed at a second time, etc.

Generally speaking, considering a number of available tones within a given TVWS channel (e.g., N total available tones), then a subset of those available tones (e.g., capital M) may be used to carry information. Again, any available tones that each respective and of the channel will not carry any information and not be occupied.

Figure 19:
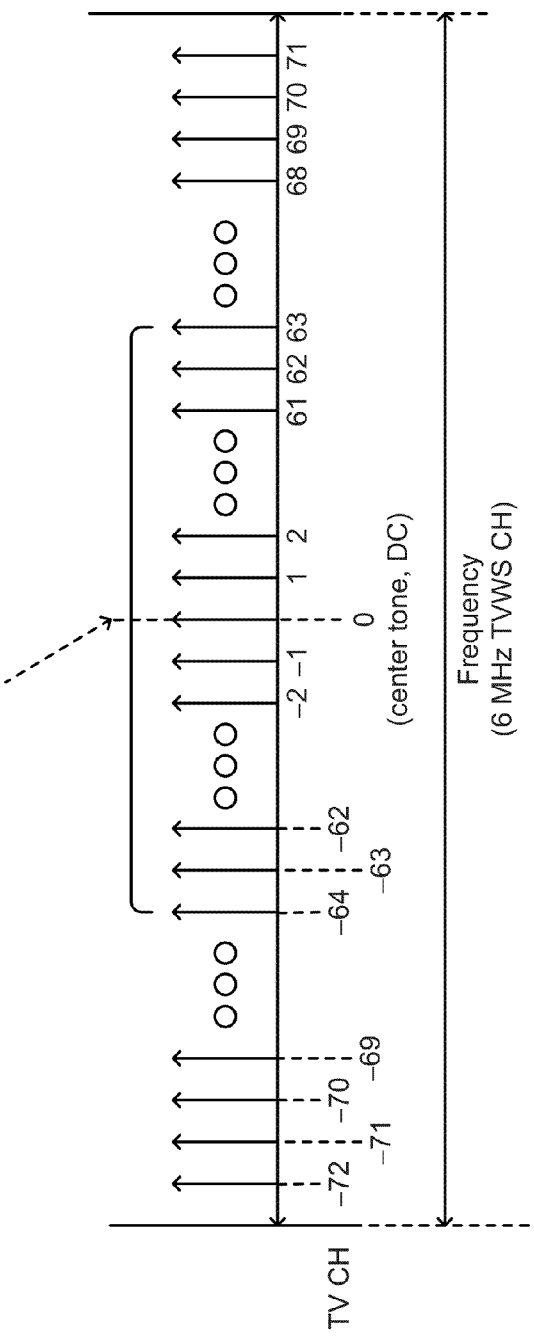
FIG. 19 illustrates an alternative embodiment of support for a number of contiguous channels based on centrally located information among a number of available tones within a TVWS channel.

FIG. 19 illustrates an alternative embodiment 1900 of support for a number of contiguous channels based on centrally located information among a number of available tones within a TVWS channel. This diagram considers a particular exemplary embodiment of a 6 MHz TVWS channel. If it is considered that the usable BW of the 6 MHz TVWS channel is between 5 MHz and 5.5 MHz (e.g., accounting for sufficient band edge considerations to comply with appropriate spectral mask requirements, etc.), then considering the use of a 128 FFT, then a number of available tones within this 6 MHz TVWS channel may be selected to be N=144.

Therefore, these 144 tones occupy 6 MHz, and the 128 FFT signal BW is 128/144×6 MHz=5.333 MHz=⅔×8 MHz. As may be understood, the generation of a 5.333 MHz clock signal is relatively easy to generate based upon 8 MHz clock signal.

Of course, other alternative options of N may be employed within other alternative embodiments, however it may be preferable and certain embodiments to have N to be an even number and better divisible by a factor of 4. For example, STF tones may be implemented and defined to be on every fourth tone.

FIG. 20 illustrates an embodiment 2000 of support for a number of contiguous channels based on centrally located information among a number of available tones within two adjacent TVWS channels. This diagram shows two adjacent 6 MHz TVWS channels that cooperatively form a 12 MHz TVWS channel. In implementation, of the entire available 288 tones (e.g., 144×2, such that each of the left-hand side and the right-hand side of the available 12 MHz TVWS channel respectively include 144 available tones), two respective channels may be viewed as being centered around respective centrally located tones within each of the left-hand side and the right-hand side of the available 12 MHz TVWS channel (e.g., or alternatively −72 and +71 where the tone numbering zero corresponds to the center of the 12 MHz TVWS channel, as may be seen with respect to the next diagram). In other words, there are two respective groups of tones that are used each being respectively centered around a respective centrally located tone within each of the left-hand side and the right-hand side of the available 12 MHz TVWS channel. As may be understood, the use of the 72 tones provides a 3 MHz offset exactly locating each respective Wi-Fi channel operative based on IEEE 802.11 of in the center of the TVWS channel.

Figure 21:
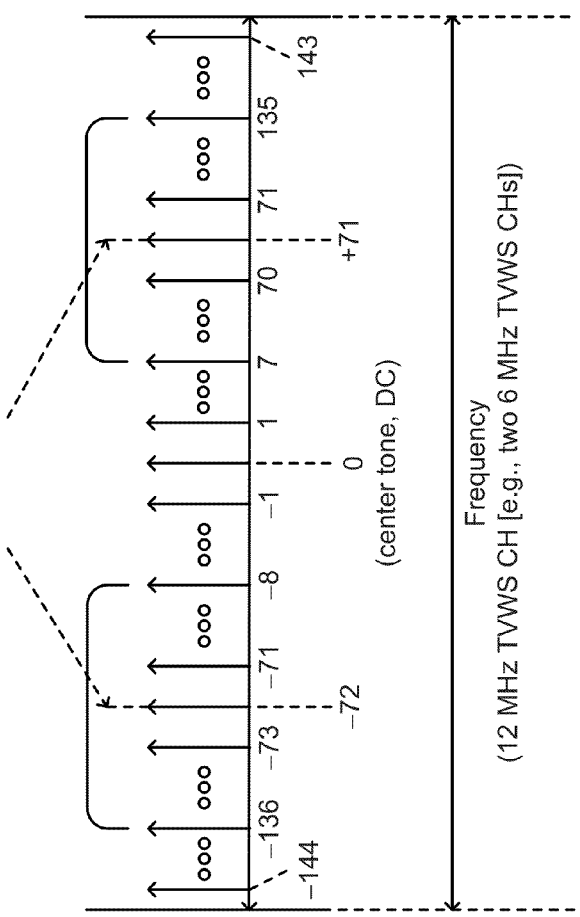
FIG. 21 illustrates an alternative embodiment of support for a number of contiguous channels based on centrally located information among a number of available tones within two adjacent TVWS channels.

FIG. 21 illustrates an alternative embodiment 2100 of support for a number of contiguous channels based on centrally located information among a number of available tones within two adjacent TVWS channels. This diagram shows an alternative depiction of two adjacent 6 MHz TVWS channels that cooperatively form a 12 MHz TVWS channel. As may be understood with respect to this diagram, the entirety of all of the available tones are numbered accordingly as extending from −144 to +143, such that the centrally located tone within the entirety of the available 12 MHz TVWS channel is identified as tone 0. Again, two respective channels may be viewed as being centered around respective centrally located tones within each of the left-hand side and the right-hand side of the available 12 MHz TVWS channel and specifically at −72 and +71 where the tone numbering zero corresponds to the center of the 12 MHz TVWS channel, as may be seen with respect to the next diagram.

FIG. 22 illustrates an embodiment 2200 of support for a number of contiguous channels based on centrally located information among a number of available tones within four adjacent TVWS channels. Generally speaking, the implementation of centrally locating information around a centrally located frequency or tone within each of one or more respective TVWS channels may be extended to any number of desired TVWS channels. In this particular embodiment, four respective 6 MHz TVWS channels cooperatively form a 24 MHz TVWS channel. In this diagram, of a total number of 576 available tones, information is placed on four groups of 128 centrally located tones around for respective tone locations (e.g., −216, −72, +71, +215). As may be understood with respect to this diagram and others, any available tones at the ends of each respective region or group of tones are not occupied. From certain perspectives, it may be understood that not all of the available tones within a given TVWS channel are necessarily employed when operating accordance with this variant, Option D.

However, it may be understood that an implementation operating based on such tone placement will effectuate the use of a singular inverse fast Fourier transform (IFFT) or inverse discrete fast Fourier transform (IDFT) [e.g., such as in the case of a transmitter CD or a transmitter portion of a CD] and a singular fast Fourier transform (FFT) or discrete fast Fourier transform (DFT) [e.g., such as in the case of a receiver CD or a receiver portion of a CD].

That is to say, after appropriately performing tone mapping within a transmitter CD, a single IFFT/IDFT may be employed on all of the available tones. However, it is of course noted that such operation may be performed separately on different respective groups of tones. However, an appropriately designed single IFFT/IDFT may be employed in a CD operating based on any one or more of the various aspects, embodiments, and/or their equivalents, of the invention.

FIG. 23 illustrates an alternative embodiment 2300 of support for a number of contiguous channels based on centrally located information among a number of available tones within one or more TVWS channels. As can be seen with respect to this diagram, and appropriately implemented tone mapper that ensures the location of the tones employed in the frequency domain are located or fall exactly (or as close as possible) to the center frequency or center tone of each of one or more respective TVWS channels may allow for a singular inverse fast Fourier transform (IFFT) or inverse discrete fast Fourier transform (IDFT) [e.g., such as in the case of a transmitter CD or a transmitter portion of a CD]. Analogously, it is of course noted that such operation may also provide for use of a singular fast Fourier transform (FFT) or discrete fast Fourier transform (DFT) [e.g., such as in the case of a receiver CD or a receiver portion of a CD].

Again, it is noted that such operation may be performed separately on different respective groups of tones. For example, as may be understood with respect to the bottom portion of diagram, a number of respective outputs from the tone mapper may be provided respectively to a number of singular inverse fast Fourier transform (IFFT) or inverse discrete fast Fourier transform (IDFT) modules or circuitries such that each respective IFFT/IDFT may be targeted to process a given respective group of tones that is centered around a particular center frequency or tone of a given TVWS channel. In addition, even when operating with respect to a singular TVWS channel a number of singular inverse fast Fourier transform (IFFT) or inverse discrete fast Fourier transform (IDFT) modules or circuitries such that each respective IFFT/IDFT may be targeted to process a given respective group of tones within that singular TVWS channel.

As may be understood with respect to operation based on this implementation that effectuates appropriate placement of the tones in the frequency domain such that they are located around a center frequency or a center tone of one or more respective TVWS channels, there is no requirement to effectuate frequency rotation or to implement a number of different respective IFFT/IDFT modules or circuitries respectively for a number of respective channels.

Figure 24:
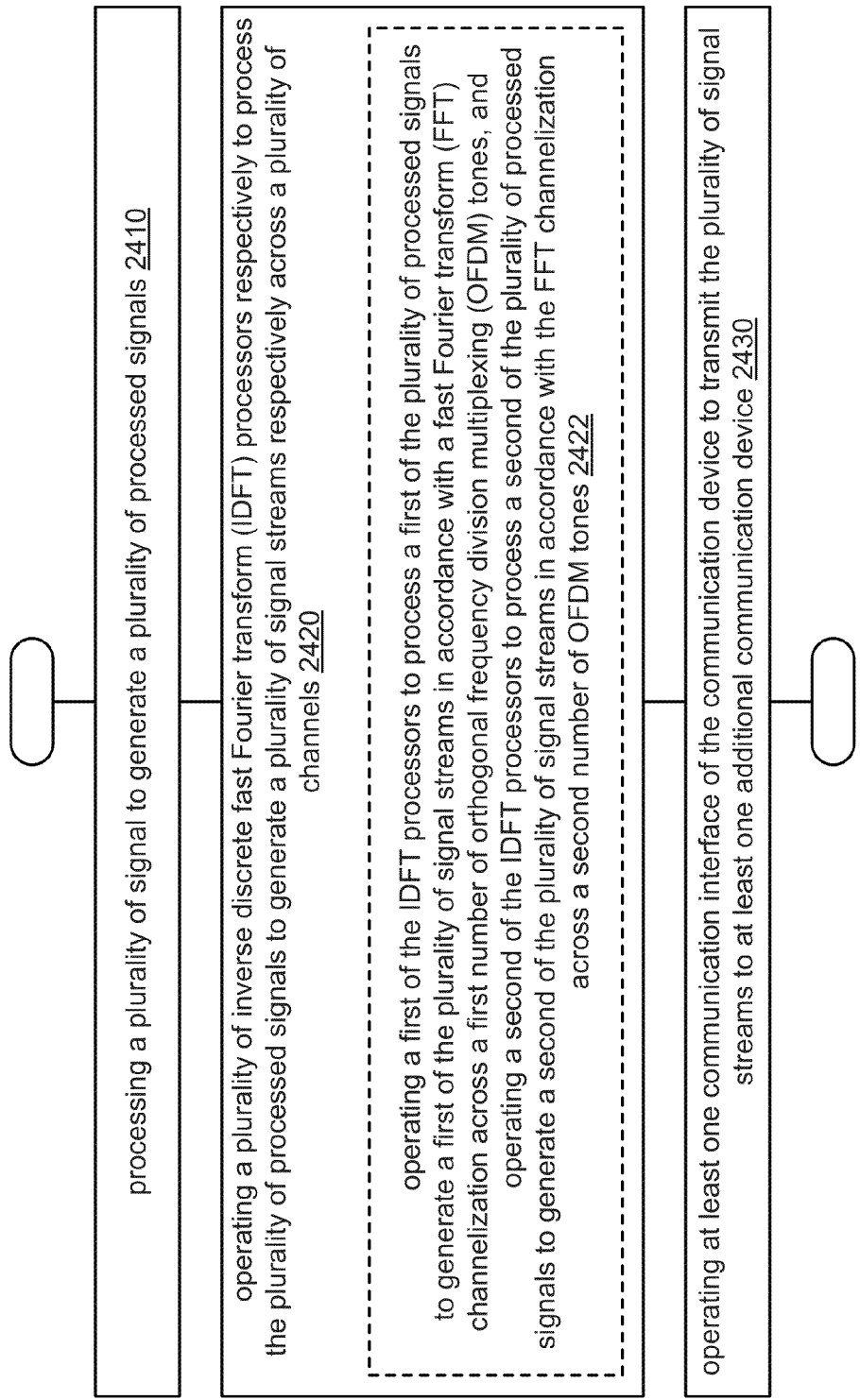
FIG. 24 is a diagram illustrating an embodiment of a method for operating one or more WCDs.

FIG. 24 is a diagram illustrating an embodiment of a method for operating one or more WCDs. Within a CD, the method 2400 begins by processing a plurality of signal to generate a plurality of processed signals, as shown in a block 2410. The method 2400 continues by operating a plurality of inverse discrete fast Fourier transform (IDFT) processors respectively to process the plurality of processed signals to generate a plurality of signal streams respectively across a plurality of channels, as shown in a block 2420. In certain embodiments, the operations of the block 2420 include operating a first of the IDFT processors to process a first of the plurality of processed signals to generate a first of the plurality of signal streams based on a fast Fourier transform (FFT) channelization across a first number of OFDM tones, and operating a second of the IDFT processors to process a second of the plurality of processed signals to generate a second of the plurality of signal streams based on the FFT channelization across a second number of OFDM tones, as shown in a block 2422. The method 2400 then operates by operating at least one communication interface to transmit the plurality of signal streams to at least one additional CD, as shown in a block 2430.

It is also noted that the various operations and functions as described with respect to various methods herein may be performed within a WCD, such as using a BPM and/or a processing module implemented therein, (e.g., such as based on the BPM 64 and/or the processing module 50 as described with reference to FIG. 2) and/or other components therein including one of more BPMs, one or more media access control (MAC) layers, one or more physical layers (PHYs), and/or other components, etc. For example, such a BPM can generate such signals and frames as described herein as well as perform various operations and analyses as described herein, or any other operations and functions as described herein, etc. or their respective equivalents.

In some embodiments, such a BPM and/or a processing module (which may be implemented in the same device or separate devices) can perform such processing to generate signals for transmission using at least one of any number of radios and at least one of any number of antennae to another WCD (e.g., which also may include at least one of any number of radios and at least one of any number of antennae) based on various aspects of the invention, and/or any other operations and functions as described herein, etc. or their respective equivalents. In some embodiments, such processing is performed cooperatively by a processing module in a first device, and a BPM within a second device. In other embodiments, such processing is performed wholly by a BPM or a processing module.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction with software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:
1. A wireless communication device comprising:
a common binary convolutional code (BCC) encoder configured to encode at least one information bit to generate a plurality of encoded bits;
a common BCC interleaver configured to interleave the plurality of encoded bits to generate a plurality of interleaved bits;
a common constellation mapper configured to:
receive the plurality of interleaved bits; and
map the plurality of interleaved bits to at least one constellation to generate a plurality of processed signals for output via a plurality of pathways;
a plurality of inverse discrete fast Fourier transform (IDFT) processors respectively configured along the plurality of pathways to process the plurality of processed signals to generate a plurality of signal streams respectively across a plurality of channels, wherein:
a first of the IDFT processors configured along a first pathway of the plurality of pathways to process a first signal of the plurality of processed signals to generate a first of the plurality of signal streams based on a fast Fourier transform (FFT) channelization across a first number of orthogonal frequency division multiplexing (OFDM) tones; and
a second of the IDFT processors configured along a second pathway of the plurality of pathways to process a second signal of the plurality of processed signals to generate a second of the plurality of signal streams based on the FFT channelization across a second number of OFDM tones; and
at least one communication interface configured to transmit the plurality of signal streams to at least one additional wireless communication device, wherein at least one of the first number of OFDM tones and the second number of OFDM tones occupying 144 tones or 128 tones within the FFT channelization.

2. The wireless communication device of claim 1, wherein:
the plurality of interleaved bits corresponding to a plurality of orthogonal frequency division multiplexing (OFDM) tones ranging from a lowest frequency tone to a highest frequency tone; and
the common constellation mapper sequentially configured to map the plurality of interleaved bits, wherein:
a first subset of the plurality of interleaved bits, including the lowest frequency tone, is mapped to a first of the plurality of channels; and
a second subset of the plurality of interleaved bits, including the highest frequency tone, is mapped to a second of the plurality of channels.

3. The wireless communication device of claim 1 further comprising:
the common constellation mapper configured to map:
a first subset of the plurality of interleaved bits mapped to a first of the plurality of channels based on with a first modulation corresponding to a first mapping of a first plurality of constellation points therein; and
a second subset of the plurality of interleaved bits mapped to a second of a plurality of channels based on a second modulation corresponding to a second mapping of a second plurality of constellation points therein.

4. The wireless communication device of claim 1 further comprising:
a plurality of insert guard interval (GI) and window processors configured to process the plurality of signal streams to generate a plurality of processed signal streams, wherein:
a first of the insert GI and window processors configured to process the first of the plurality of signal streams to generate a first of the plurality of processed signal streams; and
a second of the insert GI and window processors configured to process the second of the plurality of signal streams to generate a second of the plurality of processed signal streams; and
a plurality of frequency rotation processors configured to process the plurality of processed signal streams, wherein:
a first of the frequency rotation processors configured to rotate the first of the plurality of processed signal streams to a center of a first of the plurality of channels; and
a second of the frequency rotation processors configured to rotate the second of the plurality of processed signal streams to a center of a second of the plurality of channels.

5. The wireless communication device of claim 1 further comprising:
an access point (AP), wherein the at least one additional wireless communication device includes a wireless station (STA).

6. A wireless communication device comprising:
a common processor configured to process a signal to generate a plurality of processed signals for output via a plurality of pathways;
a plurality of inverse discrete fast Fourier transform (IDFT) processors respectively configured along the plurality of pathways to process the plurality of processed signals to generate a plurality of signal streams respectively across a plurality of channels, wherein:
a first of the IDFT processors configured along a first pathway of the plurality of pathways to process a first signal of the plurality of processed signals to generate a first of the plurality of signal streams based on a fast Fourier transform (FFT) channelization across a first number of orthogonal frequency division multiplexing (OFDM) tones; and
a second of the IDFT processors configured along a second pathway of the plurality of pathways to process a second signal of the plurality of processed signals to generate a second of the plurality of signal streams based on the FFT channelization across a second number of OFDM tones; and
at least one communication interface configured to transmit the plurality of signal streams to at least one additional wireless communication device.

7. The wireless communication device of claim 6, wherein the processor including:
a common binary convolutional code (BCC) encoder configured to encode at least one information bit to generate a plurality of encoded bits;
a common BCC interleaver configured to interleave the plurality of encoded bits to generate a plurality of interleaved bits; and
a common constellation mapper configured to:
receive the plurality of interleaved bits; and
map the plurality of interleaved bits to at least one constellation to generate a plurality of processed signals for output via the plurality of pathways.

8. The wireless communication device of claim 7, wherein the plurality of interleaved bits corresponding to a plurality of orthogonal frequency division multiplexing (OFDM) tones ranging from a lowest frequency tone to a highest frequency tone; and further comprising:
the common constellation mapper sequentially configured to map the plurality of interleaved bits, wherein:
a first subset of the plurality of interleaved bits, including the lowest frequency tone, is mapped to a first of the plurality of channels; and
a second subset of the plurality of interleaved bits, including the highest frequency tone, is mapped to a second of the plurality of channels.

9. The wireless communication device of claim 7 further comprising:
the common constellation mapper configured to map:
a first subset of the plurality of interleaved bits mapped to a first of the plurality of channels in accordance with a first modulation corresponding to a first mapping of a first plurality of constellation points therein; and
a second subset of the plurality of interleaved bits mapped to a second of a plurality of channels in accordance with a second modulation corresponding to a second mapping of a second plurality of constellation points therein.

10. The wireless communication device of claim 6, wherein at least one of the first number of OFDM tones and the second number of OFDM tones occupying 144 tones or 128 tones within the FFT channelization.

11. The wireless communication device of claim 6 further comprising:
a plurality of insert guard interval (GI) and window processors configured to process the plurality of signal streams to generate a plurality of processed signal streams, wherein:
a first of the insert GI and window processors configured to process the first of the plurality of signal streams to generate a first of the plurality of processed signal streams; and
a second of the insert GI and window processors configured to process the second of the plurality of signal streams to generate a second of the plurality of processed signal streams; and
a plurality of frequency rotation processors configured to process the plurality of processed signal streams, wherein:
a first of the frequency rotation processors configured to rotate the first of the plurality of processed signal streams to a center of a first of the plurality of channels; and
a second of the frequency rotation processors configured to rotate the second of the plurality of processed signal streams to a center of a second of the plurality of channels.

12. The wireless communication device of claim 6 further comprising:
a wireless station (STA), wherein the at least one additional wireless communication device includes an access point (AP).

13. The wireless communication device of claim 6 further comprising:
an access point (AP), wherein the at least one additional wireless communication device includes a wireless station (STA).

14. A method for execution by a communication device, the method comprising:
operating a common processor for processing a plurality of signal to generate a plurality of processed signals for output via a plurality of pathways;
operating a plurality of inverse discrete fast Fourier transform (IDFT) processors respectively configured along the plurality of pathways to process the plurality of processed signals to generate a plurality of signal streams respectively across a plurality of channels, including:
operating a first of the IDFT processors configured along a first pathway of the plurality of pathways to process a first signal of the plurality of processed signals to generate a first of the plurality of signal streams in accordance with a fast Fourier transform (FFT) channelization across a first number of orthogonal frequency division multiplexing (OFDM) tones; and
operating a second of the IDFT processors configured along a second pathway of the plurality of pathways to process a second signal of the plurality of processed signals to generate a second of the plurality of signal streams in accordance with the FFT channelization across a second number of OFDM tones; and
operating at least one communication interface to transmit the plurality of signal streams to at least one additional communication device.

15. The method of claim 14, wherein the processing the plurality of signal to generate the plurality of processed signals further comprising:
operating a common binary convolutional code (BCC) encoder for BCC encoding at least one information bit to generate a plurality of encoded bits;
operating a common BCC interleaver for BCC interleaving the plurality of encoded bits to generate a plurality of interleaved bits; and
operating a common constellation mapper for constellation mapping the plurality of interleaved bits to at least one constellation to generate the plurality of processed signals.

16. The method of claim 15, wherein:
the plurality of interleaved bits corresponding to a plurality of orthogonal frequency division multiplexing (OFDM) tones ranging from a lowest frequency tone to a highest frequency tone; and further comprising:
sequentially constellation mapping the plurality of interleaved bits, including:
mapping a first subset of the plurality of interleaved bits, including the lowest frequency tone, to a first of the plurality of channels; and
mapping a second subset of the plurality of interleaved bits, including the highest frequency tone, to a second of the plurality of channels.

17. The method of claim 15, further comprising constellation mapping:
a first subset of the plurality of interleaved bits mapped to a first of the plurality of channels in accordance with a first modulation corresponding to a first mapping of a first plurality of constellation points therein; and
a second subset of the plurality of interleaved bits mapped to a second of a plurality of channels in accordance with a second modulation corresponding to a second mapping of a second plurality of constellation points therein.

18. The method of claim 14, wherein at least one of the first number of OFDM tones and the second number of OFDM tones occupying 144 tones or 128 tones within the FFT channelization.

19. The method of claim 14 further comprising:
operating a plurality of insert guard interval (GI) and window processors to process the plurality of signal streams to generate a plurality of processed signal streams, including:
operating a first of the insert GI and window processors to process the first of the plurality of signal streams to generate a first of the plurality of processed signal streams; and
operating a second of the insert GI and window processors to process the second of the plurality of signal streams to generate a second of the plurality of processed signal streams; and operating a plurality of frequency rotation processors to process the plurality of processed signal streams, including:
  operating a first of the frequency rotation processors to rotate the first of the plurality of processed signal streams to a center of a first of the plurality of channels; and
  operating a second of the frequency rotation processors to rotate the second of the plurality of processed signal streams to a center of a second of the plurality of channels.

20. The method of claim 14, wherein the communication device being an access point (AP), and the at least one additional communication device being a wireless station (STA).

* * * * *